Dec. 10, 1968  H K. BRYSON ET AL  3,415,561
DOOR HOLDERS AND STOPS
Original Filed Jan. 24, 1961  8 Sheets-Sheet 1

INVENTORS:
Alfred B. Castle
H Knox Bryson
Milford A. Juten

BY Milford A. Juten
ATTORNEY

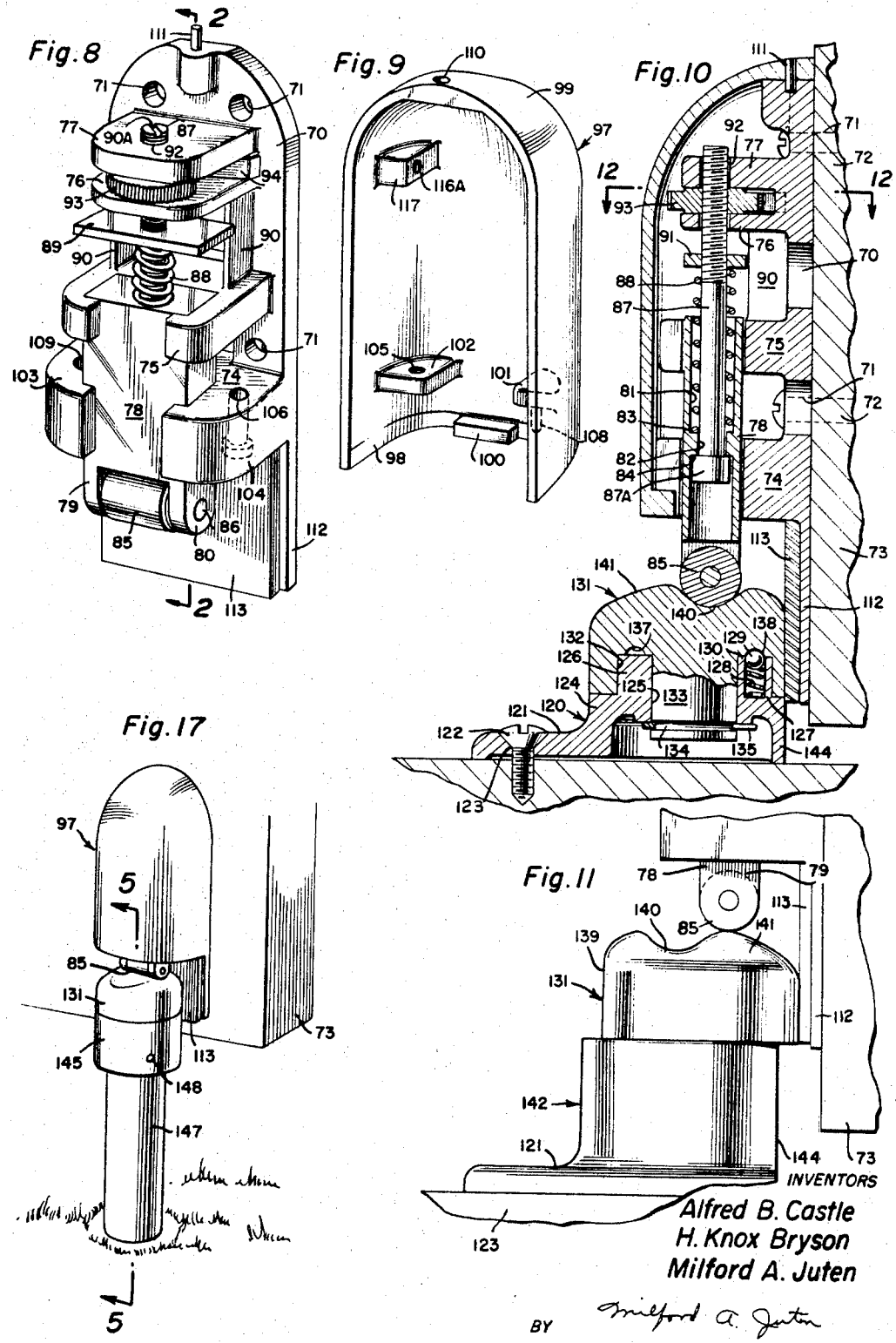

Dec. 10, 1968   H. K. BRYSON ET AL   3,415,561
DOOR HOLDERS AND STOPS
Original Filed Jan. 24, 1961   8 Sheets-Sheet 3
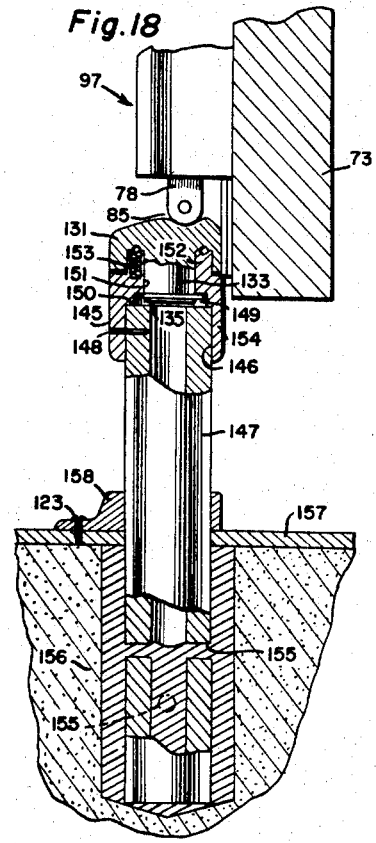
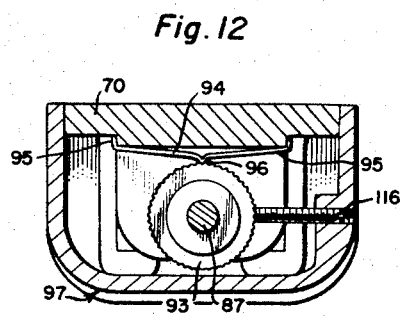
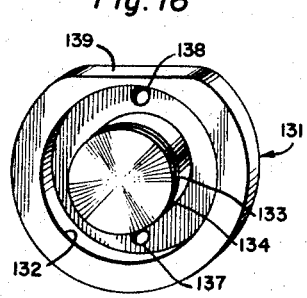
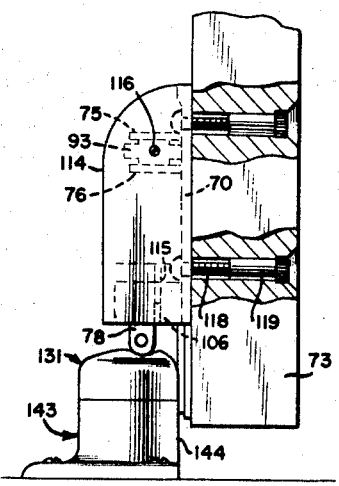
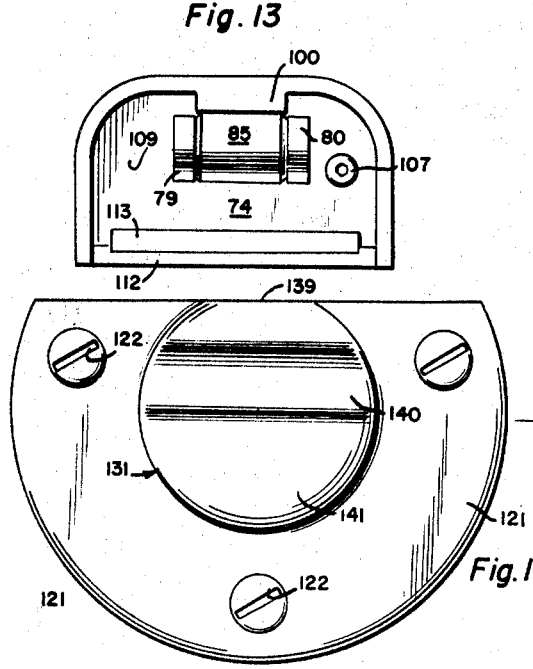
INVENTORS
Alfred B. Castle
H. Knox Bryson
Milford A. Juten
BY
ATTORNEY

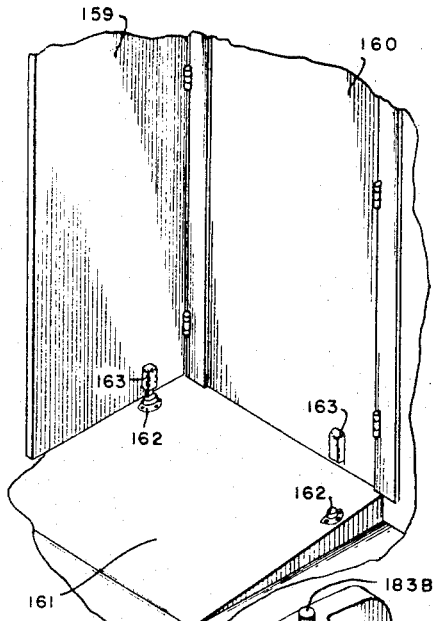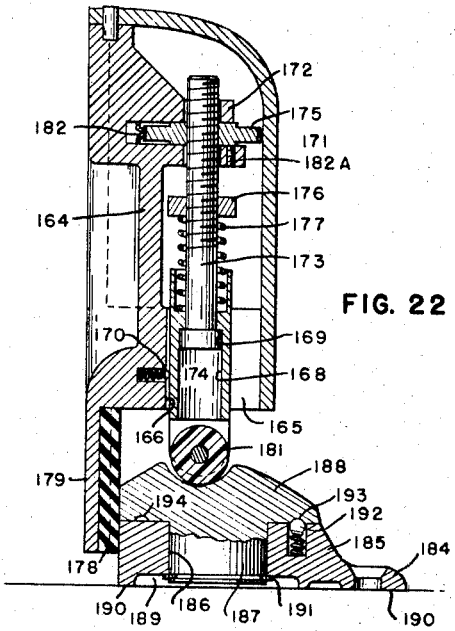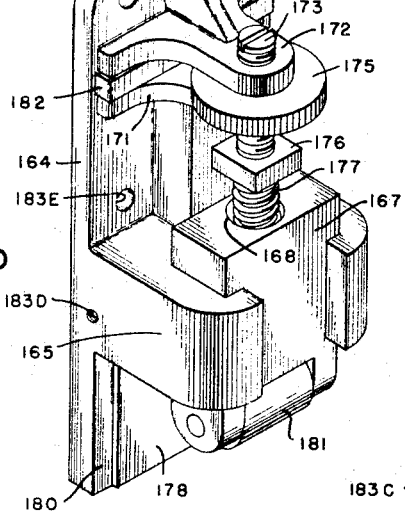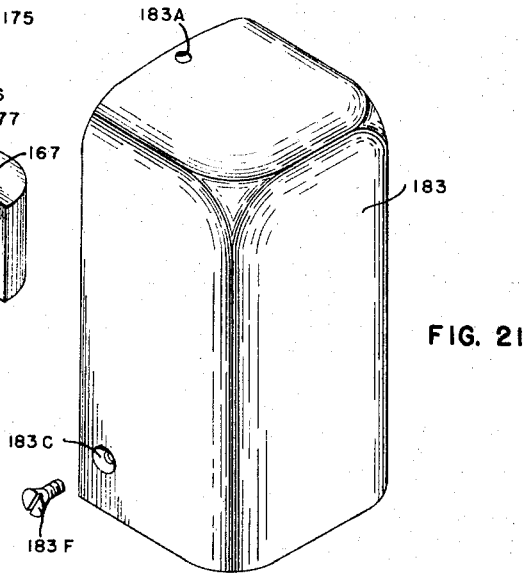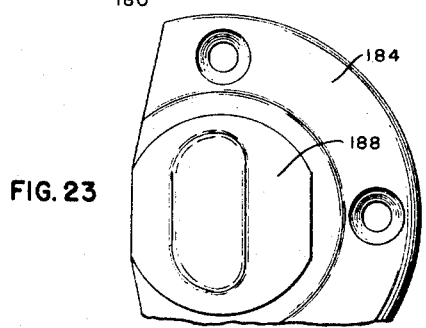

Dec. 10, 1968     H K. BRYSON ET AL     3,415,561
DOOR HOLDERS AND STOPS
Original Filed Jan. 24, 1961     8 Sheets-Sheet 5
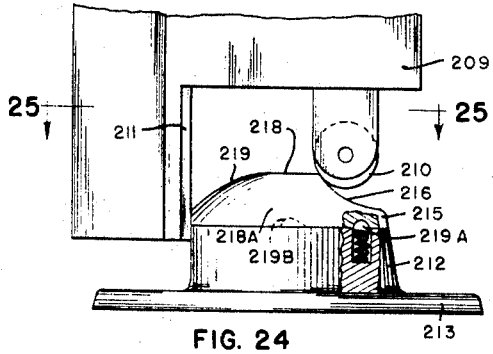
FIG. 24
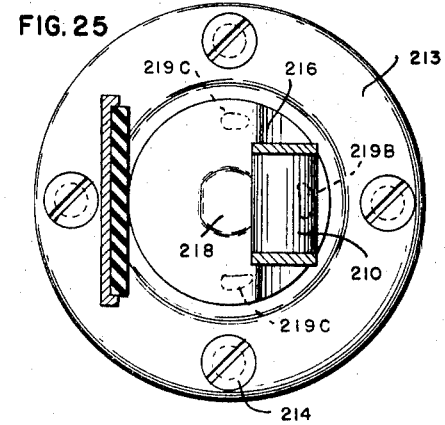
FIG. 25
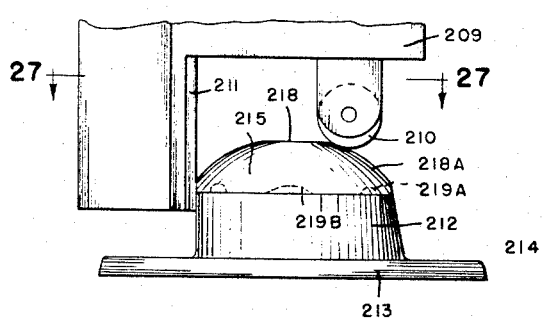
FIG. 26
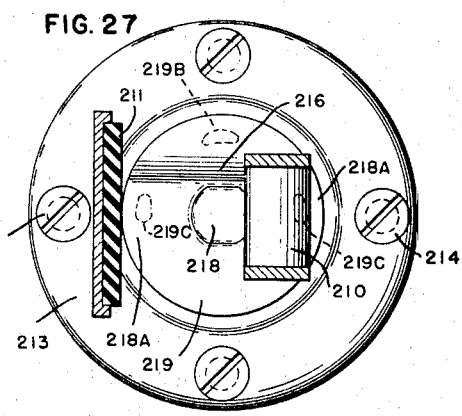
FIG. 27
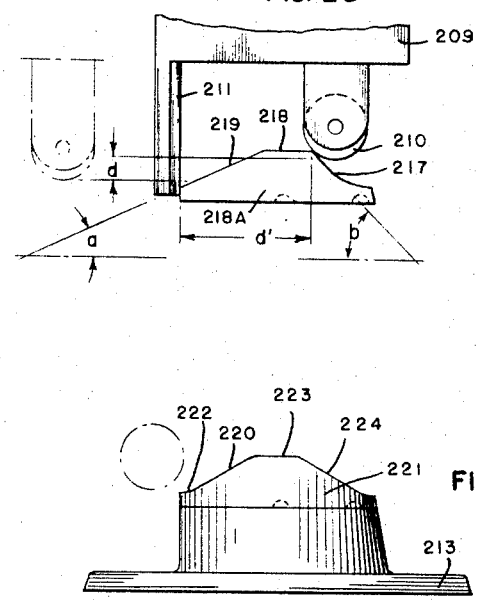
FIG. 28
FIG. 29
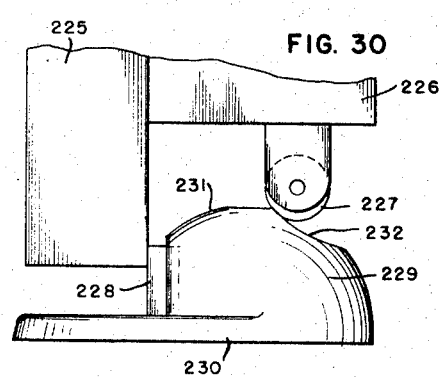
FIG. 30
INVENTORS
ALFRED B. CASTLE
H. KNOX BRYSON
MILFORD A. JUTEN
BY  *Milford A. Juten*
ATTORNEY

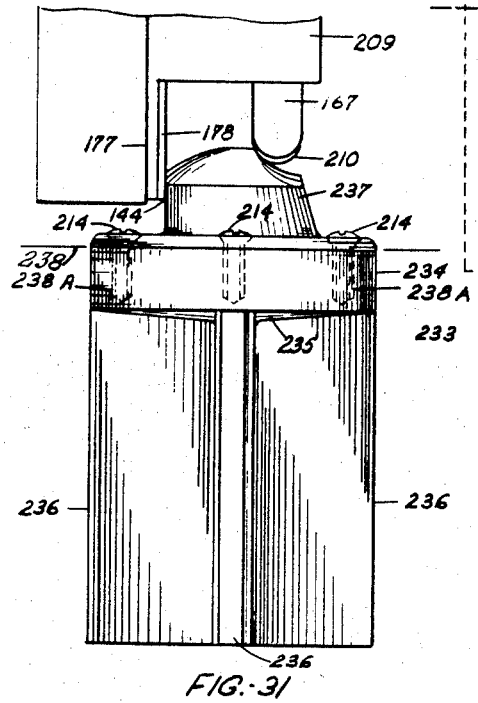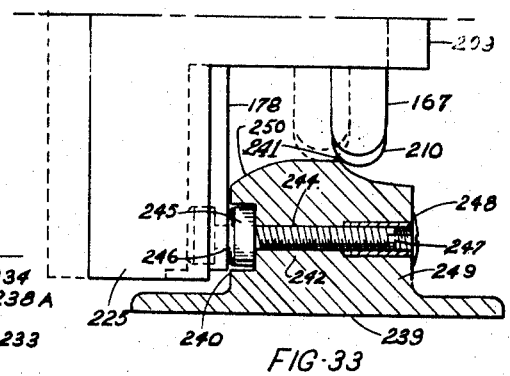

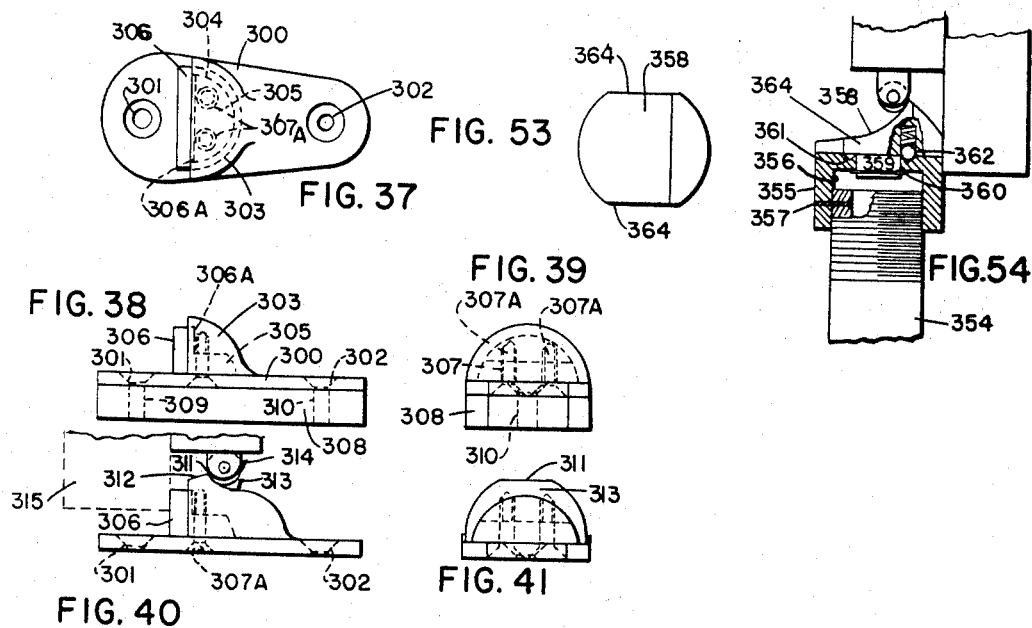

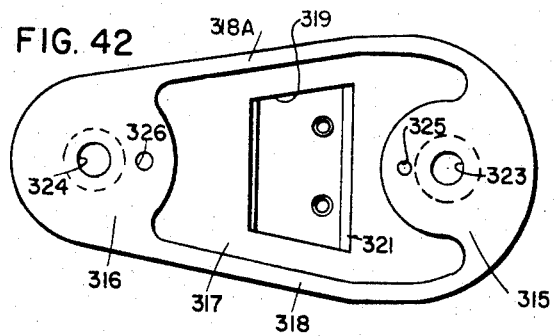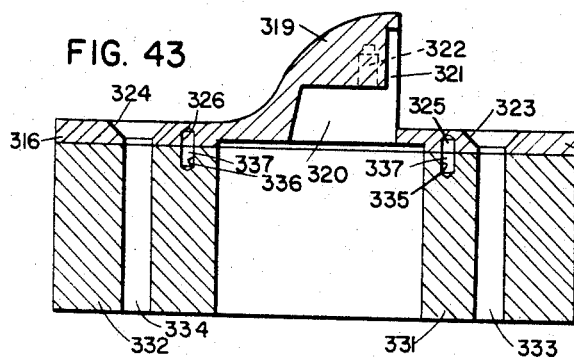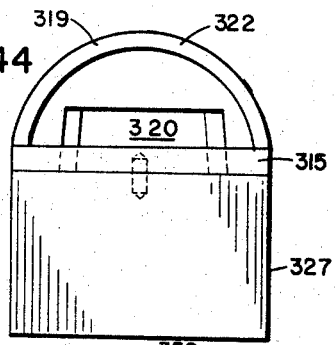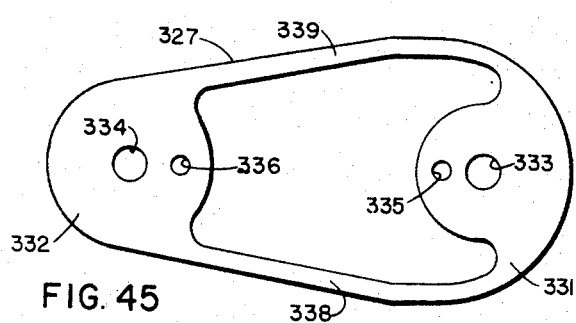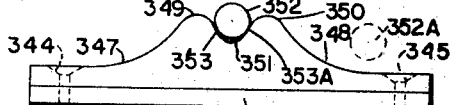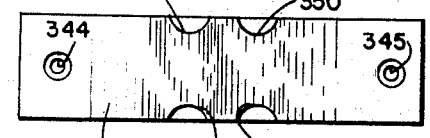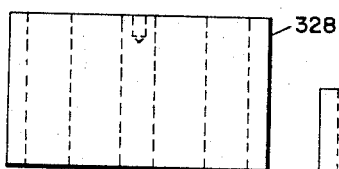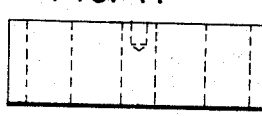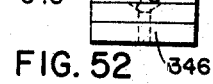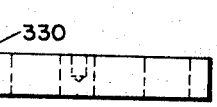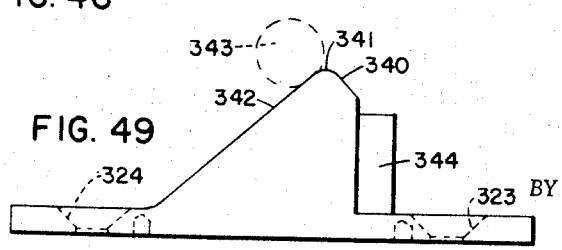

United States Patent Office 3,415,561
Patented Dec. 10, 1968

3,415,561
DOOR HOLDERS AND STOPS
H. Knox Bryson, Vienna, Va., and Alfred B. Castle and Milford A. Juten, Brookmont, Md.; said Alfred B. Castle and said Henry K. Bryson assignors, by direct and mesne assignments, to Lavona Andrews Bryson, St. Petersburg, Fla.
Original application Jan. 24, 1961, Ser. No. 84,675, now Patent No. 3,239,261, dated Mar. 8, 1966. Divided and this application Sept. 24, 1965, Ser. No. 505,422
22 Claims. (Cl. 292—341.19)

ABSTRACT OF THE DISCLOSURE

A door stop is positioned adjacent an edge of a door. In some disclosed forms, a part of the stop forms a detent for engagement with a downwardly-biased wheel detent housed on the door. The detent mechanism may be vertically adjustably positioned, and the stop may also be rotatably and axially adjustable.

---

The present invention relates to hardware and more particularly to door holders and door stops used for holding doors open and preventing doors from moving beyond a predetermined position, and is similar to our prior applications Ser. No. 405,738, filed Jan. 23, 1954 and Ser. No. 513,658, now abandoned, and continuation-in-part applications Ser. No. 784,150, filed Dec. 31, 1958, and Ser. No. 6,584, filed Jan. 1, 1960, now Patent 3,163,452, issued Dec. 29, 1964, application Ser. No. 84,675, filed Jan. 24, 1961, now Patent 3,239,261, issued Mar. 8, 1966, the present application being a division of Ser. No. 84,675.

Although door holders and door stops have been used for holding doors open and preventing doors from moving beyond a fixed point, the prior art structures have not been entirely satisfactory since the force required to push the door to its held open position beyond the floor projection has been so great as to twist the door. In hospitals and other places where people of little strength desire to operate the doors and where noise is objectionable it has not been possible to use door holders to the maximum extent. Also the noise resulting from lost motion has been objectionable. Although door holders may have been satisfactory for one installation, differences in spacing between the bottom of the door and the floor have made it necessary to provide excessively high door stops or keepers to serve under all conditions. In use these high door stops or keepers have been objectionable as interfering with the smooth contour of the floor with resulting danger to people and damage to equipment such as floor waxers and the like.

It is an object of the present invention to overcome the above enumerated defects of the prior art door holders and door stops.

A further object is to provide a door holder which is adjustable for use with different height keepers or stops and which is adjustable for different tensions exerted by door closers so that a single model of door holder may be used with a large number of door closers without requiring separate engineering considerations for each use.

A further object is to provide a door holder which may be used with extremely low door stops.

Another object is to provide a door holder keeper or stop which has a smooth outline of large curvature on convex corners to prevent injury to persons or equipment.

A further object is to provide a door holder which cannot be damaged by children, or misused by unauthorized persons.

Another object is to provide a smooth exterior for the device with weather and tamperproof covers to prevent damage to the device by climatic conditions and/or by vandals.

A further object is to provide a door holder door stop combination which has a snubbing action on the inertia forces in a door being opened with excessive force.

Another object is to provide a detent and keeper combination of general utility to provide a controlled retaining force.

Another object is to provide a mounting for a keeper which is secure and provides for obtaining precise angular positioning on a base.

A further object is to provide a door holder combination which will not rattle and can be operated with small force in both the hold open and releasing operations.

Another object is to provide means for securing a cover onto a door holder so that it cannot be removed by unauthorized persons.

A still further object is to provide an attachment for other door holders to prevent rattling and to prevent loosening of door stops.

Other objects will become apparent as the description proceeds and upon reference to the drawings in which:

FIGURE 8 is a perspective view of another embodiment of the body or chassis of the door holder with the slide and adjusting means in operative relation.

FIGURE 9 is a perspective of the cover of the holder of FIG. 8.

FIGURE 10 is a vertical section of the door holder mounted on a door and one size of door stop mounted on the floor with the parts in operative door holding relation.

FIGURE 11 is a fragmentary side elevation of a portion of the door holder with a cooperating door stop for a door of greater clearance and mounted in position on the floor and shown in adjusted condition whereby the door is not to be held open.

FIGURE 12 is a section taken on line 12—12 of FIG. 10 showing both the spring and locking screw to maintain the adjusted relation of the door holder.

FIGURE 13 is a bottom view of the door holder of FIGS. 8 to 14.

FIGURE 14 is a side elevation of the door holder with an intermediate size of door stop and showing another means of securing the cover in position and locking the adjustment wheel and showing another means of securing the holder on the door.

FIGURE 15 is a plan view of the door stop in operative position and also of an integral one piece non-adjustable door stop showing the smooth rounded contour and the smooth attaching flange.

FIGURE 16 is a perspective view of the rotating cap from the bottom of the cap for the door stop.

FIGURE 17 is a perspective view on a reduced scale of the lock edge of a door with a holder and the door stop or keeper mounted on the upper end of a pipe for installations where the door swings out over a step or the like.

FIGURE 18 is a fragmentary elevational view with parts in section of a combination similar to that shown in FIGURE 17 for use over wood floors supported on a concrete base.

FIGURE 19 is a fragmentary perspective showing a bank of doors equipped with the present door holder and door stop illustrating the adaptability of mounting close to the building wall and inwardly from the edge of the lock edge of the door.

FIGURE 20 is a perspective of a further modification of the holder permitting reduced overall dimensions.

FIGURE 21 is the cover for the holder of FIG. 20.

FIGURE 22 is a vertical section through the door holder, cover, and stop of the modification of FIG. 22.

FIGURE 23 is a plan view of the stop shown in FIG. 22.

FIGURE 24 is an elevation of a fragment of a door holder on a fragment of door and a modified form of door stop for storage of energy in the holder spring and to obtain a clamping section between the door stop and the door holder preventing lost motion and rattling.

FIGURE 25 is a horizontal section taken on line 25—25 of FIG. 24.

FIGURE 26 is a fragmentary elevation showing the door holder and stop in cooperative non-hold open position.

FIGURE 27 is a horizontal section taken on line 27—27 of FIG. 26.

FIGURE 28 is a diagrammatic view illustrating the geometric relation of the parts to obtain the clamping and snubbing action.

FIGURE 29 is a diagrammatic view of a further modification designed to have a minimum of jarring in operation.

FIGURE 30 is a further modification of door stop and door holder.

FIGURE 31 is an elevation of another support for the keeper for mounting in plastic concrete flush with the surface of the concrete and on which the keeper can be angularly mounted to correspond to the actual angle of the door.

FIGURE 32 is a bottom view of the supporting base showing one position of a set of tapped holes therein.

FIGURE 33 is an elevation of a fragment of a door holder and a vertical section of a door stop with an adjustment mechanism on the door stop to control the final position of the projection of the bolt in hold open position.

FIGURE 34 is an elevation of one form of adjustment mechanism mounted on the door holder and stop and for controlling the force of retention between the door holder and door stop in door hold open relation.

FIGURE 35 is an elevation of another form of adjustment device mounted on the door.

FIGURE 36 is still another form of adjustment device and with a selectively operable hold open means whereby the door holder and door stop can be selectively used for holding the door open or serving only as a snubber and door stop.

Figure 1:
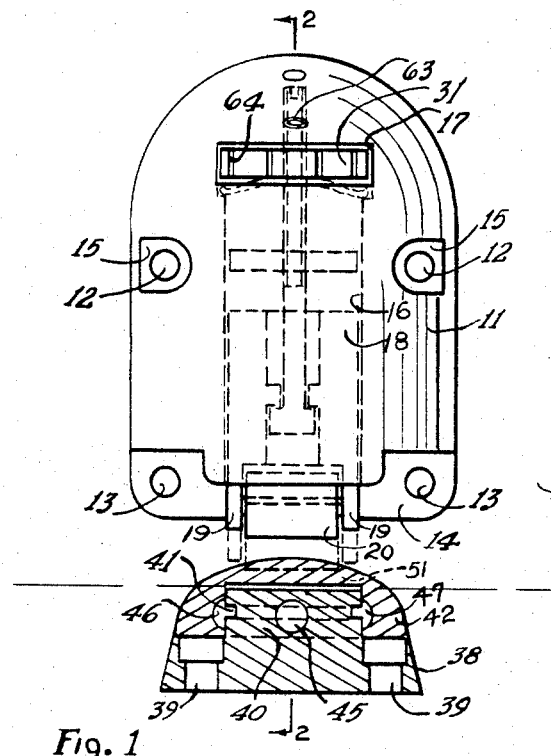
FIGURE 1 is an elevation of the door holder shown on a rear portion of a door indicated by phantom lines and one form of the keeper shown in section in operative relation therewith mounted on the floor.

Each of the following FIGURES 37 to 63 is identified by a numeral in a circle.

FIG. 37 is a plan view of a door stop for mounting on the floor and having substantially spaced fastener receiving openings located on the approach and distant sides of a door stop abutment surface to assure permanent securement to the floor.

FIG. 38 and FIG. 39 are side and end views of the door stop of FIG. 37 mounted on a shim or mounting base for use with a door having greater floor clearance.

FIGS. 40 and 41 are side and rear end views of a door stop similar to FIGS. 37 to 39 with cooperating bolt retaining surfaces.

FIG. 42 is a bottom plan view of another form of door stop similar to FIGS. 37 to 41.

FIG. 43 is a vertical section of the door stop of FIG. 42 with an elevating base support for use with doors of substantial clearance such as doors having large floor clearance for ventilation.

FIG. 44 is a front view of the door stop and base plate of FIG. 43.

FIG. 45 is a top plan view of a base support.

FIGS. 46 through 48 are side views of base supports of different thickness for use with the door stop of FIGS. 42 to 44 for use with doors of varying clearance.

FIG. 49 is a side elevation of a similar door stop with bolt engaging cam surfaces for use with a door holder.

FIG. 50 is a side elevation of a keeper for use with a door holder to retain a door in an intermediate position.

FIGS. 51 and 52 are top and end views of the keeper of FIG. 50.

FIG. 53 is a top plan view of a door stop or keeper adjustably mounted on the upper end of a rod for use with any desired height of door above a floor or supporting surface.

FIG. 54 is a section of the turret door stop of FIG. 53 rotatably mounted on a cap shown in section which is rotatably and vertically adjustable on a pipe fixed in concrete and showing the relation of a cooperating door and holder.

Briefly the present invention includes a body or chassis mounted on a door with a movable detent or slide mounted in the body for projection from and withdrawal into the body or chassis. A single headed bolt passes through the slide and has its head limiting projecting movement of the slide. The slide is axially adjustable in the body by a threaded adjusting wheel which is held against axial movement relative to the body. A nut is mounted on the bolt and a spring is also mounted on the bolt and reacts between the slide and the nut. When the bolt is rotated relative to the nut the tension of the spring is changed. The bolt serves as means for adjusting the nut and thereby the tension of the spring and adjustment of the wheel determines the location of operation of the slide whereby the position of the projecting end of the slide can be accurately controlled and the necessary vertical movement of the slide may be kept to a minimum.

A keeper with a cap mounted for rotary movement is secured on the floor and has a ridge on the approach side of the cap formed by a transverse valley or depression in the cap for engaging the projecting end of the slide after the slide is positioned beyond the ridge and thereby retain the door in an open position. Rotary movement of the cap in either direction serves to locate the ridge and the valley or groove out of its operative transverse position and renders the keeper inoperative and the slide ineffective for retaining the door, but the keeper in cooperation with the holder produces a snubbing stopping action. The adjusting wheel also provides a means for moving the slide out of contact with the keeper or stop to render the holder ineffective. The stop may be an integral unit if desired to reduce cost.

The stop may be mounted on a pipe to accommodate for doors swinging out over a step and the heights of the stops can be varied for different clearances of doors. The mounting of the stop on a pipe also provides angular adjustment of the abutting stopping surface with relation to the open door. A modified form of flush floor mounting base provides for secure attachment and for angular adjustment of the stop.

Figure 2:
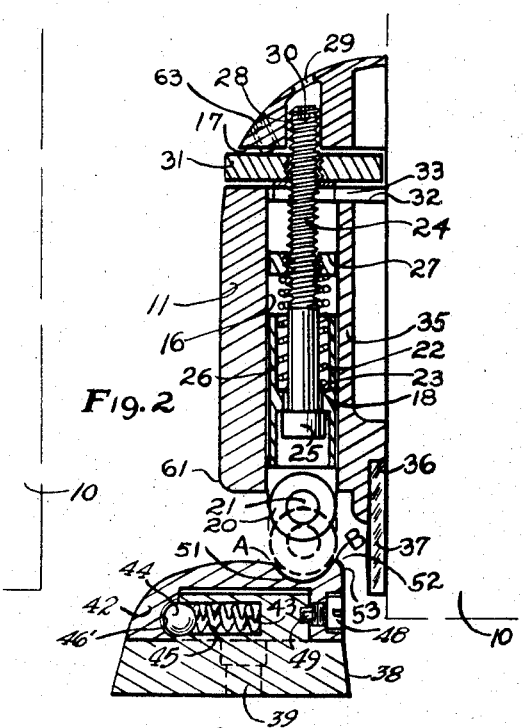
FIGURE 2 is a section on line 2—2 of FIG. 1.
Figure 3:
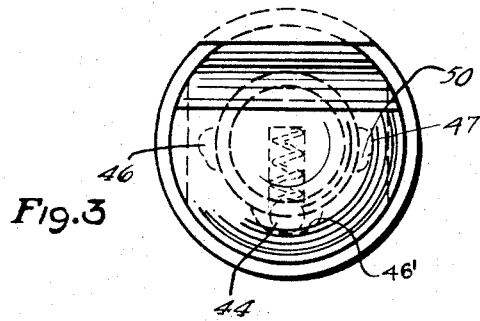
FIG. 3 is a top plan view of the keeper or stop shown in FIGS. 1 and 2 with dotted line showings of two adjusted positions.

Referring more particularly to FIGS. 1, 2 and 3 of the drawing, the lower corner of the lock edge of a door 10 shown in phantom has a door holder mounted thereon. The holder comprises a rounded semi-cylindrical body 11 having apertures 12 in the upper portion thereof and apertures 13 in a skirt portion 14 for receiving fastening screws or the like for securing the holder on the door. Suitable screw head receiving recesses 15 are provided for preventing the screw heads from projecting above the surface of the body. The top portion of the exterior of the body 11 is of spherical contour.

A channel 16 shown as rectangular extends through the bottom of the holder body 11 and terminates adjacent the top where a transverse channel 17 intersects channel 16; said channel 17 is open at the outer and inner sides of the holder body and is of a width greater than the width of channel 16. A slide 18 of a shape to snugly fill the channel 16 is mounted for vertical sliding movement and has tines 19, 19 between which a roller 20 is rotatably supported by means of an axle pin 21 extending through the roller, the axle pin being riveted or otherwise suitably fixed to the tines 19. The roller is of a size to be receivable in the channel 16 for extreme vertical adjustment if desired.

The slide is provided with a vertically extending passage 22 with a shoulder 23 within the passage and intermediate the top and bottom thereof. A headed screw 24 is positioned in the passage 22 with its head 25 below the shoulder 23 preventing the slide 18 from moving beyond the limit of the head.

A compression spring 26 is positioned in the upper portion of the passage 22 and reacts against the upper surface of the shoulder 23 and also against a nut 27 nonrotatably mounted in the channel 16 and threaded on bolt 24. The nut is of a size to be received in channel 16 and is prevented from rotation by engagement with the sides of the channel, the nut being adjustable by rotation of the bolt 24 thereby varying the pressure on the spring 26 between the nut 27 and the shoulder 23. The upper end of the bolt 24 is slidably received in a bore 28 extending upwardly from the transverse channel 17 and being restricted at its end in a smaller bore 29. The upper end of the bolt 24 is provided with a polygonal socket 30 of the "allen head" type for receiving a polygonal shaped tool for obtaining the proper adjustment of the spring pressure. The restricted bore 29 prevents unauthorized adjustment of the spring 26 without the proper tool. However the bore 28 may be continued through the top to permit use of longer bolt for greater adjustment.

Threaded on the upper portion of bolt 24 is an adjusting wheel 31 of a size to be received in transverse channel 17. The channel may be made of a size to snugly engage the upper and lower surfaces of the wheel thereby preventing vertical movement of the adjusting wheel whereby rotation of the wheel will raise or lower the bolt 24 with the slide to any desired location of operation. However a rabbet 32 may be formed adjacent channel 17 at each edge thereof and an apertured arch spring 33 embracing bolt 24 and supported by the ledges of rabbets 32 is provided for urging the adjusting wheel 31 upwardly against fixed abutments.

The upper side of the adjusting wheel may be provided with a hub 34 and the body 11 may be counterbored for snugly receiving the hub 34 thereby centering the adjusting wheel for guiding the upper end of the bolt 24, the counterbore also serving as a bearing for the wheel. The construction with the arched spring permits a smaller adjusting wheel or nut to be used and the resulting dimension of the body outward from the door may be reduced making the sides of the channel 16 as thin as desired for economy of materials. The body is shown as being formed of a casting or the like with a web 35 forming the door side of the channel 16 and such web may be of any desired height to provide adequate bearing surface. The adjusting wheel 31 is a flat disk with a threaded bore and the disk presses directly on the portion of the body at the upper end of the channel 16. In one embodiment roller bearings have been used on the front and back of the slide reducing friction particularly for use with heavy doors and heavy spring tensions in door closers or in the door holder, suitable ledges being provided in the body at the top and bottom of the rollers to retain the rollers in operative position during shipment or use.

The skirt 14 may be provided with a recess 36 in the door side thereof and a piece of rubber-like material 37 may be fastened in the recess to serve as a bumper for engaging a stop or keeper. The strip 37 may be retained by the clamping action of the door holder fastening screws on the door, the strip 37 being clamped between the door and the skirt 14. Other fastening means may be used to secure the strip 37 to the skirt such as screws, rivets or the like. It will be evident that the strip 37 may be mounted on the outer surface of skirt 14 to engage a stop or abutment in a conventional manner.

Cooperating with the holder on the door is a keeper shown mounted on the floor including a base 36 having a smooth substantially frusto-conical shape and flattened at the front and provided with screw receiving apertures 39 recessed from the upper surface of the base so that the screws may be located with their heads entirely below said upper surface of the base. An upwardly extending cylindrical projection 40 on the base is provided with an annular groove 41 around its periphery.

A cap 42 provided with a circular recess cooperating with the projection 40 is pivotally mounted on the base for movement about the vertical axis of the projection 40. The projection 40 is provided with a horizontal bore 45 extending part way through and open at the rear and communicating with the groove 41. Within the bore a spring 43 extends to the inner and thereof urging a ball 44 outwardly into contact with the inner periphery of the recess of the cap. The inner periphery of the cap is provided with ball receiving recesses 46, 46', and 47 into which a portion of the ball 44 projects when the correspondingly recess is in alignment therewith, the ball being shown in recess 46 corresponding to the position of the cap when a door is to be held open. The cap 42 is retained on the projection 40 by means of a screw 48 threaded through the front of the cap having its head countersunk within the cap; a projection 49 on screw 48 extends into the groove 41 on the projection of the base, retaining the cap on the base. The recesses 46, 46' and 47 may be made to permit the cap to be easily moved from the full line position to the dotted line positions and may prevent further rotation by shaping such recesses with a gradual cam surface as shown at 50. It will be apparent that the spring 43 urges the cap against the front of the projection 40 thereby taking up any lost motion or inaccuracy in manufacture. The recess 48' has an elongated portion which is substantially concentric with the center of projection 40 so that the groove or valley 51 in the cap 42 will turn to snugly engage roller 21 in the event of inaccurate mounting of the base 38.

The cap 42 is made of a smooth rounded exterior and at the front it is slightly flattened like the base. Said cap is provided with a valley 51 formed between a ridge 52 adjacent the front and the round center of the cap; the forward edge of the ridge 52 provides an inclined surface 53 over which the roller 20 of the holder slide rides when the door is opened and when the door is to be kept open. The valley 51 is preferably made of a contour so that the roller 20 contacts on two lines A and B retaining the roller 20 from having lateral movement after engagement, and preventing rattling between the roller and the cap.

From the above it is believed that the operation should be clear. Assuming the cap to be in the full line position and the door being moved to its open position, the roller 20 strikes the inclined surface 53 of the cap (the normal position of the roller being only slightly below the position shown in dotted lines) thereby slowing up the opening movement of the door due to the reaction against the spring 26, the roller riding over the ridge 52; the roller 20 then drops into the valley 51. Further movement of the door causes roller 20 to ride toward the center of the cap up the incline of the rear side of the valley where the further compression of spring 26 additionally retards or snubs the door and in the event the door is not stopped the rubber-like strip 37 strikes the flattened front of the cap or the base or both depending upon the adjusted relation of the parts thereby limiting the opening movement of the door. The roller 20 then drops back into groove 51 and the door is held open.

When the door is not to be kept open, the cap 42 may be turned to one of the dotted line positions and the roller 20 will ride up the rounded surface of the cap thereby slowing up the door by the reaction of the spring and the rubber-like strip 37 will prevent excessive movement as such strip will strike the adjacent portion of the edge of the cap 42.

Although the keeper is shown as being in the path of the door it may be positioned so that the door may completely pass thereover and the roller 20 will be the only part which will contact the keeper making it possible to retain the door in various intermediate positions by carefully positioning the door with the roller 20 in the valley 51 of the keeper. Such keepers can be made very flat with only a slight projection above the floor.

Figure 4:
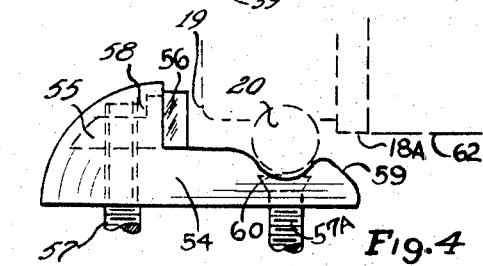
FIGURE 4 is an elevation of another form of keeper and door stop with a rubber insert to engage the outer surface of the door holder.
Figure 5:
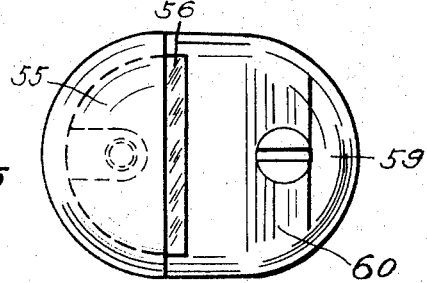
FIGURE 5 is a top view of the modification shown in FIG. 4.
Figure 6:
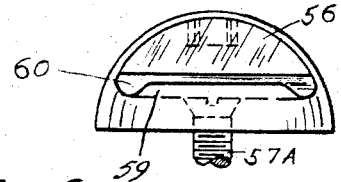
FIGURE 6 is an end view of the door stop and keeper of FIG. 4 as viewed from the approach side thereof.

A modified form of keeper and door stop is shown in FIGS. 4, 5, and 6 in which a body includes a floor contacting base portion 54 having a flattened bottom surface and a smoothly curved periphery with rounded contour including a hollow spherical segmental portion 55 at the rear with a rubber-like stop 56 therein with a portion of the rubber-like stop projecting forwardly of the spherical segmental portion. A first fastening element 57 is threaded into a boss 58 in the portion 55 and passes through an aperture in the stop 56 and through an aperture in base 54 thereby retaining the stop in position and the lower portion of the screw 57 may be screwed into the floor. A second screw 57A passes through a forward portion of the base 54 and is screwed into the floor. The forward portion of the keeper is provided with an inclined front surface 59 and a valley 60 rearward thereof for receiving the roller 20 shown in phantom. The outer surface of the holder body shown in phantom is provided with an abutment 61 at the lower edge thereof which will strike the stop 56 and prevent the door from moving therebeyond. The incline forward surface 59 and the rear side of the valley also retard the door.

From the above description it will be apparent that the pressure of spring 26 can be adjusted to obtain the proper retaining force for holding a door open and this adjustment is obtained by means of the hexagonal socket 30 in the top of the screw 24. To locate the position of the roller 20 the adjusting wheel 31 is rotated to move the bolt vertically. The roller position is arranged so that a minimum vertical displacement is required and the inclined surface 53 or 59 can be relatively small because of the limited displacement required of the slide and roller. The lost motion between shoulder 23 and the head 25 of the screw permits this movement of the slide 18 relative to the body.

Figure 7:
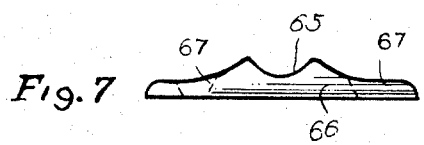
FIGURE 7 is a side elevation of a door retainer or keeper for use to hold the door in an intermediate position from which the door may be moved to increase or decrease the extent of opening.

If desired the stop 56 may be omitted and the keeper may be made low enough for the bottom of the door 62 to pass thereover as shown in phantom in FIG. 4; in such case the stop 56 and the hollow spherical segment 55 are omitted. The keeper may then be made as low as desired as shown in FIG. 7 and keepers may be located in a number of positions to hold the door partially open, completely open, or any intermediate position or may hold the door closed if desired. The projection of the keeper may be so small as not to endanger persons and because of the rounded contour there is practically no danger of persons tripping thereon. The skirt 14 of the door holder may be reduced or omitted and the body 11 provided with screw head receiving recesses like those shown at 15.

For retaining the adjusting wheel in fixed position a screw 63 may be threaded in the body 11 and be provided with an "allen head" similar to that of bolt 24 so that the same wrench will fit both and the entire adjustment can be made with the wrench and the adjusting wheel. Adjusting wheel 31 may be provided with notches 64 for engagement by the fingers or tool if desired. Also the arch 33 may have projections and the wheel 31 may have indentions or recesses for cooperation with the projections for maintaining the wheel in adjusted position. The locking screw 63 may be positioned to engage the edge of adjusting wheel in a direction perpendicular to the axis of bolt 24. Also the locking screw may be positioned so that it will be located below the wheel 31 and located to apply its pressure in a direction to raise the location adjusting wheel to abut against the portion of the body at the upper end of the channel so that the body takes the reaction of the roller directly.

The form of the invention shown in FIG. 7 includes a base of appreciable length with a valley or groove 65 thereacross for receiving and retaining the roller 20 of the holder and base 66 thereof is secured to the floor by screws countersunk in apertures 67 and screwed into the floor. This structure is preferably provided with rounded edges to prevent injury to persons or equipment. This type may be used for holding a door in an intermediate position since the roller may pass thereover in both directions.

Although the keeper is shown as being on the floor, it may be mounted on an angle bracket for attachment to a wall or other part of a building construction and the holder may be mounted on the door or other movable member for cooperation with the keeper to maintain the door closed or open as desired.

The form of the invention shown in FIGS. 4 to 6 may include a rotatable member similar to cap 42 for moving the valley out of the path of the roller 20 of the slide. A member having the valley and ridge may be rotatably mounted in a recess in the base 54. Similarly the cap 42 of FIGS. 1 to 3 may be rotatably mounted in a circular recess in the base.

The small size of the door stops or keepers will permit mounting the keeper on the end of a pipe for use in locations where steps are located below the open position of the door.

With the present door holder the tension of the spring 26 can be adjusted for use on doors that have no door closer and the present door holder may be adjusted for use with practically any door closer without requiring a careful engineering analysis, since the adjustment can be made by a workman with very little training.

The position of the slide can be arranged so there is no danger of damaging rugs by dragging thereover and the height of the keeper may be adjusted by the use of shims or washers of the shape of the base to obtain the most desirable height.

The cap 42 has the ball receiving recess 46' of appreciable length along the circumference of a circle with the center being the center of the cap 42 whereby the cap will adjust for any irregularity in mounting on the floor. If, for example, the groove or valley 51 was out of proper position for receiving the roller 20, but generally near the correct position, the cap will rotate slightly until the groove 51 is parallel with the roller 20 at the point where they engage for retaining the door in its open position. If there is any slight variation from the desired position the cap will adjust for accommodating the roller, the roller and/or the rubber-like strip 37 serving to produce this correct registration.

Although the cap 42 of the modification shown in FIGS. 1 to 3 has been shown to be separate from the base and rotatable relative thereto, it will be apparent that the entire structure may be made integral with the cap being non-adjustable accordingly reduced the height of the portion projecting above the floor and also reducing manufacturing costs since an integral structure may be cast and can be secured to the floor by screws therethrough.

The screw threads on bolt 24 and the length and size of the spring are so designed that the nut cannot compress the spring to cause each coil to contact the adjacent coil and lock the parts, and therefore there is no danger of breaking the mechanism by extreme movement, as the slide may still be urged inwardly from any adjusted position.

The adjusting wheel may be an internally threaded sleeve surrounding the upper end of the bolt 24 and the sleeve fixed against axial movement and such sleeve can be adjusted from the upper end of the body similar to the adjustment of the bolt, a groove in the sleeve and a pin or other projection from the body into the groove of the sleeve can hold the sleeve in proper position and take the reaction of the slide, or the sleeve can have a flange on the lower end and arch spring 33 may urge the flange into abutting relation with the upper end of the body. Also the arch spring 33 may be omitted and screw 63 can press the adjusting wheel against the lower portion of channel 17 thereby reducing the necessity of machining an accurate channel 17.

Although the keeper is shown as being on a stationary support such as the floor and the holder is on the movable member such as a door, it will be apparent that the keeper may be mounted on the door and holder may be mounted on the floor. In either arrangement the parts may be mortised into the door and door jamb if desired and can be used to retain the door open and/or closed.

A bearing movable relative to said slide and said bolt 24 may be located within the passage 22 of the slide 18 with the spring being in two parts, one part above the bearing and the other part below the bearing. The bearing may be of the ball bearing type within a suitable race so that the balls contact the bolt 24 and the walls of passage 22. With such a bearing the machining may be reduced on the inside of the channel 16 and the added bearing serving to guide the upper portion of the slide, the lower portion of the slide being guided by the body in the usual manner.

Referring more particularly to FIGS. 8 to 18, a modification of the invention is shown in which a cover is provided for the body carrying the slide which cover completely encloses the operating mechanism. One form of stop or keeper is mounted on a flanged base for increased stability and bases of varying height usable with a standard rotatable cap accommodate for different clearances between the floor and door to clear thresholds or thick rugs or the like. Also the standard cap may be used with a base designed for attachment to the end of a pipe to accommodate for greater clearances.

With reference to FIGS. 8 to 18 the door holder comprises a body providing a frame or chassis including a mounting plate 70 having a plurality of apertures 71 for receiving screws 72 for attachment to a door 73. A first and heavy lug 74 projects from said mounting plate 70 adjacent one end thereof while a second lug 75 spaced from said first lug and generally parallel thereto also projects from said plate, said lugs being provided with T-shaped slots forming a guideway slidably receiving a slide bar 78. A pair of flanges 76, 77 generally parallel to lugs 74, 75 project from said plate 70 adjacent the other end for receiving a captive adjusting wheel 93 therebetween.

A slide bar 78 having a pair of tines 79, 80 at one end is slidably mounted in the guideway formed by the T-shaped slots in lugs 74 and 75 and is provided with a central longitudinal bore 81 therethrough with an intermediate portion 82 of the bore being of smaller dimension providing upper and lower shoulders 83 and 84. A roller 85 of a diameter not greater than the thickness of slide bar 78 is rotatably supported on a shaft 86 extending between and secured to tines 79 and 80 by riveting or the like. The roller 85 is shown as made of metal but nylon is an especially suitable material for the roller to reduce noise. A bolt 87 is slidably mounted in said bore 81 with its head 87A adjacent the roller 85 and engageable with the shoulder 84 while a compression spring 88 surrounding the bolt lies in the other portion of the bore 81 reacting between shoulder 83 and a threaded plate 89 threaded on the threaded portion of the bolt 87, such plate being prevented from rotation by engagement with webs 90, 90 projecting from the mounting plate 70, while allowing the threaded plate to move axially whereby the spring bias may be adjusted by rotating the bolt 87 relative to threaded plate 89 by means of a screwdriver operating in screw slot 90A in bolt 87.

The flanges 76 and 77 are provided with aligned bolt receiving apertures 91, 92 through which the bolt 87 may freely slide, said flanges receiving an externally knurled and internally threaded captive adjusting wheel 93 therebetween, which wheel 93 is prevented from axial movement by said flanges 76, 77 and rotation of said wheel 93 relative to bolt 87 will cause the bolt 87 and slide bar 78 to move axially thereby adjusting the outermost position of the roller 85. A leaf spring 94 (FIG. 12) of arched configuration is provided with ears 95, 95 at each end resiliently engaging shoulders formed on the mounting plate 70 retaining the spring in position due to the design of the spring which urges the ears 95 together. The central portion of the leaf spring 94 is provided with a relatively sharp apex 96 which engages the knurled adjusting wheel 93 to retain the adjusting wheel and the bolt 87 in adjusted relation. It will thus be seen that the position of the slide 78 is adjusted by rotation of the wheel 93 and the tension of the spring is adjusted by rotation of the bolt 87 by means of a screwdriver operated in slot 90A.

A hollow cover 97 of generally semi-cylindrical shape open at one end 98 and of generally quarter-spherical shape at the other end 99 is provided with a tongue 100 which extends into the stem portion of the T-shaped slot in the lug 74, while abutments 101 and 102 on the cover cooperate with legs 103 and 104 of the lug 74, which abutments 101, 102 are received between lugs 74 and 75. The abutment 102 is provided with a threaded aperture 105 which is aligned with an aperture 106 in leg 104 which receives an "Allen" head bolt 107 (FIG. 13), having a polygonal socket therein, the aperture 106 being counterbored to completely receive the "Allen" head of bolt 107, completely hiding the bolt 107 from view. The abutment 101 has a pin 108 for reception in an aperture 109 in leg 103 of lug 74 and the other end of the cover 97 has an aperture 110 for receiving a pin 111 projecting upwardly from an enlargement at the other end of the mounting plate 70. It will thus be seen that the cover 97 will be positively retained by the pins 108 and 111 received in the cooperating apertures 109, 110 respectively and the threaded bolt 107 screwed into the threaded aperture 105 in abutment 102.

An extension 112 of plate 70 projects from the lug 74 and carries a bumper 113 of resilient material such as rubber or the like that is secured to the extension plate by suitable adhesive, rivets, screws or the like, which resilient material serves to reduce the noise upon striking the stop or keeper.

The door holder shown in FIG. 14 is similar to that shown in FIGS. 8 to 13, but the cover 114 is secured in position by means in addition to or as a substitute for the bolt 107 of FIG. 13 and a pin 115 similar to pin 108 may be fixed to abutment 102 in lieu of bolt 107, such pin 115 being received in opening 106 to positively retain the cover 114 in place against lateral displacement. To prevent the cover from being removed upwardly a locking screw 116 shown in FIGS. 12 and 14 is threaded into a threaded bore 116A in enlargement 117 (FIG. 9) and such screw 116 projects into the space between flanges 77, 76 which retain the captive adjusting wheel 93 in place, the screw 116 being tightened until the inner end thereof contacts and holds the adjusting wheel 93 in adjusted position whereby the single screw performs the function of the retaining leaf spring 94 and locking screw 107 of the modification of FIGS. 8 to 13. In FIGURE 14 the mounting plate 70 is secured to the door 73 by means of set-screws which have a bolt portion 118 passing through apertures 71 in mounting plate 70 and nut portions 119 received in the door, the nut portions being completely within the door.

Various forms of door stops or keepers are shown in FIGS. 10, 11 and 14 to 18 inclusive, the forms shown in FIGS. 10, 11 and 14 being similar except that the base portion is of varying height to accommodate for different clearances between the floor and the bottom edge of the door such as clearances from 0″ to 13/16″, 7/8″ to 19/16″, and 15/8″ to 25/16″ respectively. The modifications of FIGS. 17 and 18 are for clearances over steps or where the clearance is from 23/8″ to 10″ or more between the door and the surface which supports the stop or keeper.

The stop includes a base 120 (FIGS. 10, 15) having a flange 121 extending around a major portion thereof, as shown in FIG. 15, with screw receiving countersunk apertures 123 for receiving fastening screws 122 or the like by means of which the stop is securely fastened to the floor 123A. Such fastening screws may be used with expansion shields for concrete floors. The base includes an upstanding boss 124 (FIG. 10) having a bore 125 therethrough and an annular ridge 126 projecting thereabove. A bore 127 in annular ridge 126 retains a spring 128 which urges a ball 129 upwardly, the ball being retained in the bore 127 by the swaging of the material of the base as shown at 130. A cap 131 having an annular groove 132 (FIGS. 10 and 16) of a size to snugly receive annular ridge 126 has a pivot 133 extending through the bore 125 of said boss 124 with the pivot having an annular peripheral groove 134 which receives a split locking ring 135 which engages an annular shoulder 136 to maintain the cap 131 in proper position with relation to the base. The cap is provided with a pair of recesses 137 and 138 which selectively receive the projecting portion of the ball 129 to semi-positively retain the cap in either the door holding position shown in FIG. 11 when the ball is in the recess 138 adjacent a flattened striking surface 139 of the cap or in the door stop position shown in FIG. 11 when the ball is in recess 137. The flattened portion 139 of the cap cooperates with the rubber bumper 113 on the holder when the door is opened a sufficient amount. The cap 131 is provided with a smooth rounded exterior with a valley or groove 140 eccentrically located in the cap for receiving roller 85 to retain the door in open position. If the stop comprising the cap 131 and base 120 are to be used solely as a stop, the cap 131 is rotated into the position shown in FIGURE 11 so that the rounded exterior of the cap 131 is struck by rubber bumper 113 before roller 85 can reach valley 140, the adjacent surface 141 of the cap serving as a cam causing the roller 85 of the door holder to be urged laterally toward door closing position thereby assisting the conventional door closer in the door closing operation.

The modification of FIG. 11 includes an intermediate height of base 142 and the modification of FIGURE 14 includes a still greater height of flanged base 143 for a greater door clearance, these bases being otherwise similar to the base 120 of FIG. 10 with the same cap 131 being used with each size of base thereby reducing the number of different parts required for accommodating any clearance of door. Each size of base has a flange extending over a major portion of the periphery and each base has a flattened side 144 which registers with the flat side 139 of the cap 131 to cooperate with the rubber-like bumper 113.

Referring to FIGS. 17 and 18, the door holder is the same as in FIGS. 8 to 10 including a resiliently urged slide carrying the roller 85 receivable in the valley 140 in the cap 131, but the cap is mounted on a sleeve 145 having a bore 146 which snugly receives the upper end of a mounting pipe base 147 and is secured thereto by means of taper pins 148 or the like passing through aligned apertures in the cap and pipe. A second bore 149 of smaller diameter in communication with the first bore 146 provides a shoulder 150 which abuts against the end of the pipe 147 for axially fixing the position of the sleeve 145 on the pipe. A third bore 151 in communication with the other bores provides a bearing for the pivot 133 of the cap 131. The outer periphery of the upper end of the sleeve 145 is reduced to provide an annular ridge 152 which is received in the annular groove 132 of the cap, the cap being rotatably secured to the sleeve by means of the split ring 135 in the groove 134 of the pivot. Within a bore 153 in the annular ridge is a spring which urges a captive ball upwardly into either of the recesses 138 or 137 of the cap. It will be noted that the ball is on the side of the sleeve opposite the flattened portion 154 so that in the event of any lost motion occurring between the locking ring and the shoulder between bores 149 and 151, the side of the cap 131 adjacent the door will be urged toward its lowermost position, thereby avoiding objectionable lost motion. The spring 128 for urging the ball to operative position is of sufficient strength to firmly retain the cap in the selected position while permitting change when desired to avoid accidental or unintentional changes in position.

The pipe 147 is provided with two transverse holes 155 which additionally serve to key the pipe into a concrete floor 156 by means of which the pipe is held in position. Such pipe may be placed in position when concrete floors are poured or installed later by drilling a hole and pouring melted lead into the hole around the pipe. Frequently a wood, tile or other floor covering 156 will be placed over the concrete floor 157 and a covering flange 158 is then provided to cover the joint between the pipe and the floor covering to obtain a neat appearance, the flange being of similar appearance to the exposed portion of the base 120 and flange 121 and being secured to the floor by screws or the like.

An advantage of the pipe mounting is that the pipe is first mounted in the floor without regard to angular position of the pipe with respect to its axis and the sleeve 145 with its previously formed holes for taper pins 148 is positioned on the pipe after the door is mounted and the precise position of the bumper 113 when it strikes the flat surfaces 139 of the cap or 154 or of the sleeve 145 is known. Then the final position of the sleeve 145 is located and holes are drilled into the pipe using the previously formed holes in the sleeve as guides. The taper or locking pins 148 are driven into the aligned holes thereby assuring proper and permanent mounting of the stop with respect to the holder.

If desired a pipe may be mounted on a large flange and cut off to the desired height and the sleeve 145 secured in accurate position as described above.

The pipe 147 may be secured in other ways as by nuts or the like.

Various changes may be provided in the precise structure and the cover 97 may be held in place by both the screw 107 and screw 116 and the adjusting wheel 93 may be prevented from movement by both the spring 94 and screw 116. The chassis and cover may be made of corrosion resistant bronze or other suitable material and may be plated in nickel or chromium. The bolt 87 is threaded a limited amount so that when the threaded plate is at the limit of maximum adjustment for maximum tension of spring 88 there will be sufficient clearance for the slide to move upwardly a sufficient amount to ride into the valley 140 of the cap thereby avoiding breakage of the structure. If desired the roller 85 may be made of nylon or similar material to reduce noise. The structure of the stop is such that there is no danger of water getting into or freezing in the operative mechanism so that the cap may be rotated by a firm force under all weather conditions. The stop may be integral as shown in FIGURE 15 thereby reducing costs of manufacture.

Referring to FIGS. 19 to 23 inclusive, a bank of doors 159, 160, are mounted on hinge jambs in the usual manner and swing out over a downwardly inclined ramp 161 on which door stops 162 are mounted and cooperate with door holders 163 on the doors to retain the doors in open position as shown for door 159 and permitting closing of the door without manual stooping by merely exerting a small closing force on the door. It will be noted that door stops 162 are mounted closely adjacent the hinge jambs so that a relatively low door stop can be used and the door stop can be located out of the path of persons walking near the doors. This arrangement is permitted because the tension of the slide projecting spring can be adjusted to obtain the correct retaining force for maintaining the door open.

The modification of door holder 163 shown in FIGS. 20 to 23 includes a chassis 164 formed by casting from suitable material such as bronze and shaped to conserve material and including a lug 165 intermediate its ends having a rectangular guideway 166 therethrough which receives a rectangular slide 167 having a bore 168 extending endwise therethrough with a shoulder 169 intermediate the ends of the bore. A spring pressed ball 170 is mounted in chassis and urges the slide outwardly transversely of the direction of movement to prevent rattling.

A pair of flanges 171, 172 are fixed adjacent one end of the chassis. A beaded and threaded bolt 173 having its head 174 engaging the other end side of shoulder 169 has its threaded shank passing freely through apertures in flanges 171, 172 and threaded through a captive threaded nut 175 by means of which the position of the slide can be adjusted relative to the chassis 164.

A spring adjusting nut 176 is threaded on bolt 173 and engages one end of a compression spring 177, the other end of the spring 177 engaging the one end side of shoulder 169 for causing a projecting force on slide 167 in accordance with the adjustment of the nut 176.

The other end of the chassis is provided with an abutment surface 178 made of a rubber like material secured to a skirt 179 by any suitable means, the skirt 179 having side flanges 180, 180 with no flange on the extreme end. A nylon roller 181 is rotatably mounted on a pin mounted in a recess in the other end of the slide opposite the abutment surface, the roller being of a size to be receivable in the rectangular guideway 166 to permit maximum adjustment.

The adjustment of the captive nut 175 is maintained by means of an arch shaped spring 182 having a projecting knob engaging the knurled or serrated edges of the captive nut 175. Additionally or as a substitution a set screw 182A may be threaded in lower flange 171 and urge the captive nut upwardly against the upper flange 172 to avoid lost motion. Alternatively or in addition an arched apertured spring leaf may be mounted on the upper surface of flange 171 with bolt 173 passing through the aperture in a manner similar to arch shape spring 33 and may be provided with projections engageable with apertures or the like in the adjusting captive nut 175. The spring adjusting nut 176 is of a size to be prevented from rotation by engagement with the adjacent raised portion of the chassis whereby adjustment of the spring tension can be accomplished by rotating the bolt 173 with a screw driver in the slot thereof. A lock nut can be added for engaging nut 176 to prevent possibility of change of adjustment of the nut 176 relative to the bolt, the lock nut would be of smaller dimensions to permit complete rotation of such lock nut.

The door holder mechanism is hidden by a cover 183 having an aperture 183A for receiving a pin 183B projecting from the one end of chassis 164 for retaining the one end portion of the cover on the chassis. The sides of the other end of the cover 183 are provided with countersunk apertures 183C which receive Allen head screws threaded into threaded apertures 183D in the sides of the lug 165. The cover is shaped to be easily applied to the chassis covering the edges of the chassis and hiding the mechanism of the holder and hiding the attaching screws thereof passing through apertures 183E in the chassis. The cover sides are spaced somewhat further apart than the corresponding parts of the chassis and serve as a spring lock means since tightening of the cover securing screws 183F deforms the cover somewhat by forcing the sides together producing a locking action on the screws.

The door stop includes a base having a flange 184 and a boss or hub 185 provided with a bore 186 which receives a pivot stud 187 of a cap 188 for rotation of the cap relative to the base. The under surface of the base is provided with a recess 189 and with a peripheral floor engaging surface 190. The pivot stud projects into the recess 89 and is provided with a locking ring receiving groove in which a split locking ring 191 is mounted to retain the cap on the base. The cap is maintained in door hold open position by a spring pressed ball 192 in the base received in a recess 193 in the cap, another recess 194 being provided for cooperation with the spring pressed ball 192 to maintain the cap in snubbing position.

It will be noted that the cap is shaped to conform to the base in both positions thereby providing a smooth outline which cannot damage floor waxers or the like and the smooth rounded contour prevents injury to persons. It will be apparent that the door stop is mounted on the floor with screws or the like.

The combination of the door holder and keeper serves to act as an effective snubber to reduce the jarring action of stopping the door when it is forcibly opened and pushed into contact with the door stop as explained above. An improved snubbing action is obtained by the particular shape and dimensions of the door stop cap as shown in FIGS. 24 and 30.

The holder 209 is provided with the usual adjustment for displacement and for the tension of the spring and thereby for the roller 210 as disclosed in the previous embodiments and with the abutment surface 211 which is adapted to engage the door stop.

The door stop base 212 is shown as having a flange 213 entirely around its periphery which is secured to the floor or other support by means of screws 214. The cap 215 rotatably mounted in the manner previously described is circular in plan and is generally dome shape with a more sharply sloping away surface 217 forming a depression 216 on one side of its axis sloping to the adjacent edge thereby omitting the valley previously used. The approach side or door side of the stop cap is gradually sloped at 219 from the door edge to the center, the center being practically flat for a limited region adjacent the axis.

When the holder and stop are used to hold the door open as shown in FIGS. 24 and 25 the abutment surface 211 engages the circular cap at the time the roller 210 passes over the verge into the depression 216 a sufficient amount so that the door will be held in open position. However, the roller 210 is prevented from being projected to its initial extreme projected position because the sloping surface of depression 216 causes the reaction of the roller 210 out from the holder to be limited because the abutment surface 211 of the holder contacts the periphery of the door stop base hub or the door stop cap 215 or both. Consequently the energy of opening of the door is retained in the compressed spring of the door holder and such pressure of the spring causes a pressure between the abutment surface 211 of the holder and the periphery of the door stop hub or of the stop cap 215 or both and the reaction between the abutment surface 211 and the door stop results in a constant clamping action therebetween preventing any lost motion between the door holder and the door stop.

In FIG. 28 the mechanics of this feature is shown. The roller 210 is shown in dotted line projected position just prior to engagement with the door stop and in full lines in engagement with the door stop retaining the door in clamped hold open position. It will be noted that the difference between the freely projected position of the roller as shown in dotted lines is appreciably greater than the extent of projection in the hold open position by the distance $d$. Consequently the spring in the door holder retains energy in the compressed spring by the force required to compress the spring times the distance $d$. This retention or storage of energy in the spring reduces any pounding action resulting from the momentum in the moving door striking the door stop. Further, this action serves to provide an initial force to close the door as soon as additional force is applied to close the door by moving the door so the roller 210 of the holder 209 is moved out of engaging relation with the sloping surface 217 of the door stop.

The precise position of the roller in engagement with the sloping side 217 of the depression 216 is determined by the distance $d'$ which is controlled by removing a small amount of the rubber-like material in abutment surface 211 to obtain the desired relation.

When it is not desired to hold the door open the cap 215 is rotated 90 degrees so that the center zone 218 will lie in the path of the roller 210 and the roller will merely ride up on the sloping surface of the center zone 218 as shown in FIG. 26 and the door will not be held open, but the momentum of the opening door will be smoothly snubbed by the camming action of the approach side surface 218A of the center zone 218.

In FIG. 28 the approach sloping surface 219 of the cap in hold open position is shown as having an angle $a$ to the horizontal while the angle of slope 217 of depression 216 is identified as angle $b$ with respect to the horizontal. Because of the greater horizontal movement of the roller 210 from the door side of the stop to the position where the door is held open the slope $a$ of the surface 219 can be more gradual than the slope of angle $b$ of retaining surface 217 and consequently the spring force required to project the roller 210 outwardly from the chassis of holder and still retain the door open can be made smaller than the spring force required to hold the door open when the slope of surface 217 is the same as that of surface 219.

Further the fact that the cap 215 is circular also avoids any turning forces on the holder cap from one portion of the abutment surface 211 striking the surface of the stop at a non-radial location to the pivot that otherwise would tend to rotate the cap and the base of the door stop. The force is directly taken up by the hub 212 and the pivot axis of the cap 215 and therefore the stop will not be loosened from its fastenings by the pounding action resulting from the eccentric action of the roller 210 striking the stop and the abutment surface 211 in different non-radial directions.

It will be noted that the cap is held in operative position by means of a spring pressed ball 219A which cooperates with cooperating depressions 219B and 219C in the cap and such depressions, 219C in the cap may be arranged to limit the extent of movement so that the cap may only rotate 90 degrees by the camming arrangement similar to that shown in 46 and 47 in FIG. 3. The depression 219B permits movement in both directions while retaining the cap in door hold open position similar to that shown in FIG. 3.

A still further modification of stop is shown in FIG. 29 in which the slope of approach surface 220 of the cap 221 varies from substantially a horizontal portion 222 to a steeply sloped portion at the location of lead line 220 to a substantially flat top portion 223. The distant surface 224 may slope at the same angle or preferably at a steeper angle to more effectively retain the door in open position. It will be evident that the completely peripheral flange 213 assures more positive retention of the stop in position.

The arrangement shown in FIG. 30 is similar to the showing of FIGS. 4 and 5 and illustrates a door 225 having a door holder 226 of the type previously described with the skirt 180 omitted and having the slide with the roller 227 projecting from the holder 226. The door stop is provided with a rubber bumper 228 in a smooth upwardly projecting body 229 integral with a base flange 230 secured to the floor in any suitable manner, the entire contour being smooth and rounded to avoid damage of brushes or injury to persons. The upper surface of the body is provided with a smoothly sloping door approach surface 231 and a smoothly sloping retaining surface 232 and the dimensions are arranged to provide an effective clamping action for the door and to prevent full projection of the roller 227 as explained above thereby avoiding the pounding action of the door on the door stop. It will be apparent that the proper adjustment can be obtained by cutting part of the rubber like bumper 228 away to obtain the desired adjustment.

The slide may be of cylindrical shape and the roller may be in the form of a ball retained in the slide if desired to reduce manufacturing costs since the formation of circular guideways may be made by boring tools.

An integral door stop 237 shown in FIG. 31 may be supported on concrete floors in a manner to provide for the angular adjustment of the abutment surface 144 of the integral door stop 237 with the door holder or door by means of a support base 233 which includes a circular disk 234 having a downwardly extending cone 235 from which radiating flanges 236 project to the periphery of the disk.

The support base 233 is embedded in plastic concrete during building construction so that the upper surface of the base is substantially flush with the surface of the floor 238.

After the base 233 is installed in the position desired for the door stop, the door stop 237 is positioned so that the abutment surface 144 is in position for abutment by the abutment surface of rubber or the like 178 of the door holder 209 and this angular relation of the abutment surface 144 can be accurately determined regardless of whether the holder is mounted on the door or not since a spacing slab of the thickness of the skirt 179 and the rubber like abutment 178 can be placed between the door and the door stop. Thereafter the position of the attaching screws 214 can be accurately marked on the top of disk 234 by a center punch or the like at the center of each countersunk aperture of the mounting flange of the door stop to receive the screws 214.

Apertures 238A are then drilled into the disk 234 at each of the marked positions and the apertures are tapped to receive the machine screws 214. The door stop is positioned with its screw receiving apertures registering with the tapped apertures 238A and mounted in proper position by screws 214. The door holder 209 can be mounted on the door either before or after the mounting of the door stop on the base. The door holder and stop structure is therefore accurately mounted to operate with a minimum of twisting forces on the door stop or holder.

It will be apparent that the pipe base mounting 147 of FIG. 18 and the X-section base mounting 233 of FIGS. 31 and 32 provide for accurate azimuth angle mounting of the door stop thereby providing a new method of assuring that the abutment surfaces 144 and 178 are in proper operative relation.

The invention also includes structure to obtain the storage of energy in the plunger operating spring of a conventional door holder such as that shown in FIG. 33 in which the door holder may be of the type previously described with a roller 210 cooperating with the one piece integral door stop 239 which may be circular in plan having the profile contour shown with a flat abutment surface 240 against which the usual rubber like material abutment 178 mounted on the skirt portion 179 so that the door holder may cooperate with the door stop 239 in the manner previously described with respect to the showing in FIGS. 24 to 30 so that the roller serves to clamp the door holder against the abutment surfaces.

When it is desired to have the door stop 239 operate without retaining the door open it is necessary to decrease the distance between the roller 210 and the abutment surface 240 so that the roller does not pass beyond the verge or crest 241. To accomplish this result a diametrically extending threaded bore 242 counterbored at each end is formed in the door stop 239. A headed machine screw 244 having a head 245 with a rubber like buffer 246 thereon is threaded into bore 242. By turning the machine screw 242 by means of the head 245 at one end or by a slot 247 at the other end the abutment surface of buffer 246 can be moved to the dotted line position thereby limiting the movement of the door 225, and door holder 209 toward the door stop so that the roller 210 of the door holder plunger 167 can only come to the position shown in dotted lines and not pass the verge 241. Therefore the door 225 will not be held in open position, but the door will be snubbed against the door stop by the action of compressing the spring for the plunger or slide 167 in the manner previously described. A locking nut 248 in the rear counter bore 249 provides for locking the adjustment. By change of the adjustment of the screw 244 the desired action of the door stop and door holder can be obtained. It will be apparent that door holders which do not have the adjustment may be used in this modification as the approach incline surface 250 of the door stop can be long providing sufficient vertical movement of the plunger to permit use with existing door holders.

In FIG. 34 a one piece integral door stop 251 is shown cooperating with a door holder 209 with the door stop being provided with an abutment surface 252 for cooperating with a rubber like buffer 253 secured to the head 254 of a bolt 255 which is adjustably received in a threaded aperture in a skirt 256 of greater thickness than skirt 179 of the door holder. In the full line position shown the door will be retained in open position. Upon adjustment of the screw 255 to a position so that the door holder 256 will be limited to a position so that upon abutment of buffer 253 against abutment surface 252 the roller 210 can not pass beyond the verge 257 and the door stop and door holder will only have the snubbing action preventing a sudden jar on the door stop.

A lock nut 258 is provided on bolt 255 on either the back or front of skirt 256 to maintain the desired adjustment. If desired instead of a screw receiving bore 259 being provided in the door 260 the bolt head may be provided with wrench engaging surfaces and the lock nut can be provided on the door stop side of the skirt portion 256 between the skirt 256 and the head 261 of the bolt thereby locking the buffer supporting bolt in the desired position. This modification similarly assures proper snubbing action will be obtained in both adjustment regardless of whether the door holder of the present invention or competing door holders are used with this door stop.

In FIG. 35, a door holder 226 without a skirt such as that shown in FIG. 30 may be used with any of the door stops previously described and the adjustment between the door holder and the door stop can be accomplished by means of a buffer 262 on the head 262A of the female part of 263 of a sex screw. The sex screw passes through a bore in door 225 and includes a male part 264 which is received in the female part 263. The female part is threaded on its outer surface receiving a locking nut 265 which abuts the door whereby the adjustment of the buffer head 262 can be made so that the door holder and the door stop can hold the door open and/or provide the snubbing action desired as previously described.

To provide for the rapid change from door hold open condition to door stop snubbing action an attachment for securement to the door or skirt of the door holder includes the rubber like buffer 265 secured to the head of 266 of a cylindrical stud 267 slidably and rotatably mounted in one end of an externally threaded tube 268 mounted in a door 225 and held in place by a lock nut 269 against one surface of the door. An internally threaded tubular stud 270 having a head 271 is threaded onto externally threaded tube 268 and head 271 which abuts the other surface of the door. By suitable adjustment of the nut 269 and tubular stud 270 the externally threaded tube 268 is securely held in place.

A tension spring 272 within the tube 268 is secured at one end to an eye 273 on cylindrical stud 267 and secured at its other end to a strut 274 received in diametrically opposed notches 275 on the inner end of the tube 268 whereby the cylindrical stud and the buffer 265 are urged to the full line position shown in the drawing. The head 266 is provided with a plurality of lugs 276 (three being illustrated) which are received in large registering notches 277 whereby the buffer is retained in its retracted position by spring 272 when the lugs 276 are received in the large notches 277. In this position the door will be held open as roller 227 passes the verge 257.

When it is desired to have the buffer adjusted so that the door will not be held open the head 266 with buffer 265 are rotated so that the lugs 276 are partially received in shallow notches 278 in the outer end of the tube 268 thereby maintaining the buffer in the dotted line position causing the buffer 265 to engage the abutment surface 262 of the door stop 259 before the roller 227 of the door holder passes the verge 257 and therefore the door will not be held open. It will be apparent that the nuts 269 and 270 are adjusted so that when the buffer is in its retracted position shown in full lines the roller 227 will pass beyond the verge 257 a sufficient amount so that the door will be kept open. This provides means to obtain the clamping action previously described. When the buffer is rotated so that lugs 276 are received in shallow notches 278 the buffer is projected from the door so that the distance from the buffer to the roller 227 is reduced and the roller 227 cannot reach the verge 257 and therefore the door will not be held open.

It will be apparent that this modification can be used with a door holder with a skirt 256 or with a door holder without a skirt. The modification of FIGS. 34 and 35 can be mounted directly on the skirt 256 where it is desired to have the entire structure as an integral unit, the tubular screws 263 or 268 being threaded into a threaded aperture in skirt 256. It will also be apparent that these adjustment structures can be mounted in the door stop similar to the mounting shown in FIG. 33. The adjustment can be made to obtain the most advantageous operation without requiring the special characteristics of the door holder described since the slant approach portion 250 of the door stop can be made as long as necessary for the movement of door holder bolt 167 and the snubbing action can be controlled by the adjustment of the locking nuts 270 and 269. By the selection of the depth of notches and height of lugs 277 and 276 respectively the operation can be further controlled.

Referring to the modifications shown in FIGS. 37 through 41, an elongated base plate 300 having one wide end of semi-circular shape and the other end of smaller semi-circular shape with mounting countersunk apertures 301 and 302 at the respective ends for receiving mounting screws for securement to the floor. Intermediate the ends and the mounting apertures is a hollow one-quarter sphere 303 having a semi-frustoconical recess 304 therein which receives the correspondingly shaped mounting portion 305 of a rubber-like L-shaped bumper stop element which has a semi-cylindrical abutment portion 306 for direct engagement with a door to be stopped by the door stop, part of the abutment portion being received in a semi-cylindrical recess 306A communicating with recess 304. The mounting portion 305 and abutment portion 306 form the legs of the L-shaped rubber-like bumper stop element. The mounting portion 305 is provided with two laterally spaced apertures 307 for receiving attaching screws 307A passing through countersunk apertures in the base plate 300 and threaded into threaded apertures in the one-quarter sphere 303.

It will be noted that the mounting apertures 301, 302 are spaced apart a substantial distance in the direction of movement of a door when striking the door stop whereby any force against the abutment surface of cylindrical portion 306 is taken up by the mounting screws used therewith and the friction of the base plate against the floor on which the door stop is mounted. This arrangement avoids excessive strains in the door stop preventing excessive strains on the mounting screws thereby avoiding loosening of the mounting screws and door stop from the support. This substantial spacing of the mounting screws also makes it possible to use lead plugs and expansion bolts in concrete at a sufficient distance apart so that the expansion force on the lead plugs or expansion bolts and the impact of the door cannot fracture the concrete thereby assuring long permanent trouble free mounting of the door stop. A suitable size of door stop has been found to be 4 inches long with correspondingly great spacing between the mounting apertures.

The door stop of FIGS. 37 to 41 may be used with doors of different clearance with respect to the floor on which the door stop is mounted and to provide for such difference in clearance, mounting base supports or shims are provided so that a single size and shape of door stop may be used with any clearance of any door. The mounting base support or shim 308 is of the same shape in plan as the door stop so that the door stop can be neatly mounted thereon to increase the height of the abutment surface 306 to contact the door even through the clearance of the door from the floor is substantially increased. It will be apparent that several different thicknesses of mounting base or shim may be provided so that the proper height of the abutment surface 306 is obtained to contact the door to limit the opening movement of the door. In manufacture the door stop has taper from the bottom of the base upwardly while the mounting base also has taper from the bottom toward the top with the top of the mounting base support 308 being of identical dimension to the bottom of the door stop base making a smooth uninterrupted upwardly tapered side surface. The taper used in casting has been found to be sufficient. The mounting base or shim 308 is provided with apertures 309 and 310 in registry with countersunk apertures 301 and 302 respectively for receiving the fastener screws or the like to secure the door stop and mounting base support 308 in fixed position on a floor. The fasteners are substantially spaced apart in the direction of movement of the door thereby permitting the use of a plurality of fasteners such as machine screws in expansion plugs in concrete or masonry without any danger of such expansion plugs causing the concrete or masonry in which they are mounted from fracturing with resulting loosening of the fasteners.

The modification of FIG. 40 and 41 has similar parts identified by the same reference numerals as in FIGS. 37 to 39 and differs in that a ridge 311 is formed by an approach cam surface 312 and a trailing cam surface 313 which cooperate with a roller 314 of a door holder to retain a door 315 on which the door holder is mounted, in abutting clamping relation to abutment surface 306. This stop or keeper structure also provides for the storing of energy in the compressed spring in the door holder reducing the impact of the door on the door holder and providing for the clamping action of the door against the the door stop.

Upon reference to the modification shown in FIGS. 42 to 48 a door stop of reduced weight is made to provide for great spacing between fastener elements and to provide for mounting at different heights for accommodating doors having different amounts of floor clearance, the showing omitting the L-shaped rubberlike bumper 305, 306 previously described for simplicity and to more clearly show the structure.

The base includes leading and trailing mounting pads 315 and 316 connected by an intermediate trapezoidally apertured plate-like portion 317 having a flange margin 318 substantially flush with the bottom surface of the mounting pads. Extending upwardly from the intermediate plate-like portion 317 is a hollow generally quarter-sphere 319 elongated in transverse direction having smooth gradually curving portions connecting with the intermediate plate-like portion 317. Said hollow generally quarter-spherical portion 319 has an L-shaped recess 320, 321 opening toward the leading end and the bottom of the door stop and being in registry with the trapezoidal shaped aperture in intermediate portion 317 to provide snug reception of an L-shaped rubber-like bumper similar to the rubber-like bumper 305, 306 previously described with respect to FIGS. 37 to 41 except that the horizontal portion 320 of the L-shaped recess in the instant modification is trapezoidal in both plan and side elevations so that positive planar abutment is obtained against the substantially plane surfaces defining the horizontal portion 320 of the L-shaped recess. The vertical portion of the L-shaped recess includes a substantially cylindrical portion 321. The rubber-like bumper is of corresponding shape and is secured in place by screws passing through the trapezoidal base portion of the rubber-like bumper and threaded into the threaded apertures 322 in the hollow upstanding generally quarter spherical shaped portion 319 of the door stop.

The leading and trailing ends of the door stop are of generally semi-circular shape and fastener receiving countersunk apertures 323 and 324 are provided for attachment to a supporting surface in greatly spaced relation assuring permanent securement to the supporting surface even when the door stop is subject to excessive impact forces. The mounting pads are also provided with blind downwardly opening shear pin receiving bores 325 and 326.

The door stop is adapted for use with doors having substantial variations in floor clearance by the use of skeleton mounting base supports of the proper thickness to raise the abutment surface of the door stop to a height to cooperate with the bottom portion of the door to serve the function of stopping the door without requiring a different door stop for each clearance. The base support 327 is shown of greatest thickness in FIGS. 43, 44 and 45, the base supports 328, 329 and 330 of FIGS. 46, 47 and 48 respectively being of progressively lesser thicknesses to provide for wide variations of clearance of the doors.

Each skeleton mounting base support includes mounting pads 331 and 332 of substantially the same shape and dimensions as mounting pads 315 and 316 of the door stop and are provided with fastener receiving apertures 333 and 334 cooperating and registering with apertures 323 and 324 respectively on the door stop so that the same fastener may be used to secure the door stop and mounting base in fixed position. Blind upwardly opening shear pin receiving apertures 335 and 336 are provided in the mounting base for registry with blink apertures 325, 326 respectively and such registering apertures receive shear pins 337 to prevent relative sliding of the door stop on the mounting base. The pads 332, 331 are connected by peripheral wall portions 338, 339 to maintain the pads in fixed position and such walls 338 and 339 cooperate with the peripheral flange margins 318, 318A of the door stop to give a continuous closed margin preventing any difficult to clean corners. It will also be understood that the taper of both the mounting base support and of the door stop is such that there is smooth registry of the periphery of both on their abutting surfaces and the lower portions are of slightly longer and wider dimension that their upper portions to increase the base in contact with the floor and to permit taking advantage of the taper provided in making castings. The rubber-like bumper which is provided for use with this modification is of a height to accommodate variation in clearance of the door within the differences between the thicknesses of the various mounting bases provided.

In FIG. 49 a similar door holder is shown to cooperate with a roller 343 of a door holder and includes an approach cam surface 340 which extends to a ridge 341 and to a trailing cam surface 342 which cooperate with a roller 343 of a door holder to retain the door in a desired position. An L-shaped rubber-like bumper 344 and the other portions of the door holder are substantially the same as that previously described in FIGS. 42 to 48 being adapted for mounting at different heights from the floor by the use of different thicknesses of mounting base supports.

Upon reference to FIGS. 50 to 52 a door retaining keeper is shown which may retain the door in any desired intermediate position including a closed position or any desired open position and is similar to that shown in FIG. 7. The structure includes an elongated body of rectangular configuration with mounting countersunk apertures 344, 345 at the ends. The body can be mounted in a mortise recess for flush mounting or on a mounting base 346 of similar outline and having registering apertures where it is desired to have the keeper body located further above the mounting surface for increased door clearance.

It will be observed that the exposed surface of the body of the keeper includes gradually sloping cam approach surfaces 347, 348 extending from each end and terminating in spaced ridges 349 and 350 respectively which ridges are separated by a valley 351 so that a roller 352 of the bolt of the cooperating door holder can be retained in the valley or retained on one of the sloping trailing surfaces 353 and 353A defining the valley so that if other stop means such as a conventional door stop engages the door prior to roller 352 contacting both surfaces 353, 353A, the door will be clampingly held against the door stop due to the roller 352 contacting cam surface 353 or 353A without having the roller 352 simultaneously engage both cam surfaces 353 and 353A. It will also be noted that the roller 352 may be adjusted to project to the dotted line position shown at 352A so that a substantial portion of the kinetic energy of the moving door is absorbed and stored in the operating spring of the door holder which projects the bolt to such position, the displacement adjustment being such as to permit the unimpeded bolt to project the roller to the dotted line position 352A. As previously stated the door holder carrying roller 352 may be mounted in a mortise recess in the door to avoid observation of the holder.

Referring to FIGS. 53 and 54, a modified form of door stop is shown to include an upstanding threaded pipe 354 fixedly mounted in concrete or the like and on such pipe an internally threaded cap 355 having a bore 356 in the top thereof is adjustably mounted by the screw threads for rotation and vertical adjustment relative to the pipe 354. To maintain the adjusted position one or more aligned holes are drilled in the pipe and skirt portion of the cap after the desired adjustment is obtained and pins 357 are driven therein. A turret 358 having a shank 359 rotatably received in bore 356 of the cap is detachably and rotatably secured to the cap by a split ring 360 received in a groove in the shank 359 and engaging the under surface of the top of the cap thereby retaining the turret in position on the cap while permitting relative rotation thereof.

The upper surface of the cap is provided with diametrically opposed ball receiving recesses 361 which cooperate with a spring pressed ball 362 mounted in a blind bore in the turret 358 and urged against the cap and into the ball receiving recesses whereby the turret can be retained in either the operative door holding position shown or can be rotated to serve only as a stop. The turret and cap are shown as having flat edges 364 on each side to provide wrenching surfaces for rotation of the cap and the turret. It will also be apparent that the arrangement may be such as to retain the turret in other positions as desired.

It will also be apparent that the arrangement shown may include a solid cap and turret and that vertical adjustment can be obtained by the expedient of telescoping the cap the desired amount and merely driving pins 357 into aligned pin receiving apertures in the cap and pipe and such apertures are preferably drilled at the time of installation to obtain the proper height of the door stop or keeper to cooperate with door holders which may be of many different types. It will also be apparent that the cap can be secured by other means such as soldering or welding when the desired height is obtained and that the pipe can be cut off to obtain the correct height thereby simplifying the original installation as the pipe 354 which pipe can be longer than necessary and the final cutting can be made at the time the door is in place and the door holder is mounted on the door.

What is claimed is:

1. A door stop for attachment to a pipe comprising a sleeve having a first bore at one end for snugly receiving a pipe, said sleeve having a second bore of smaller diameter in communication therewith, a turret having a pivot stud of sufficient length to pass through said second bore and reach into said first bore, said turret having a transverse ridge formed therein eccentric to said pivot, a spring pressed detent in one of said cap and said sleeve and the other of said cap and said sleeve having a recess for cooperating with said detent for selectively retaining said cap with the ridge in angularly disposed positions for retention or snubbing cooperation with a door holder.

2. The invention according to claim 1 in which means are provided to retain said turret on said sleeve and means are provided for adjustably securing said sleeve on a pipe for angular and axial adjustment relative to said pipe, and means to secure said sleeve permanently in adjusted position on the pipe.

3. A door stop for angular adjustable mounting including a rod having a circular configuration for supporting the stop, means to mount the rod on a support, said stop comprising a member having a bore snugly receiving the circular portion of said rod, said member having a ridge for cooperation with a door holder, and means to fix said member on said rod whereby proper angular adjustment of said ridge can be obtained for cooperation with the door holder.

4. The invention according to claim 3 in which the member is axially adjustable relative to said rod.

5. A door stop for adjustment to cooperate with a door holder having a movable detenting part of non-adjustable range of movement comprising an upstanding support rod having a threaded upper end and having its lower end secured on a support, an internally threaded cap adjustably secured to the upper end of the rod, means to secure said cap in adjusted angular and axial position, a turret mounted on said cap for rotation thereon, said turret having a ridge thereon located off center of the axis of rotation, means to releasably secure said turret in adjusted rotative position with the ridge adjacent the door approach side, the adjustment of said cap providing for cooperative relation with a door holder whereby the proper retaining relation between the door holder and the door stop can be maintained.

6. A door stop comprising an elongated base, an upstanding substantially one-quarter stop sphere positioned with a face thereof transverse of said base being of significantly greater width at the end adjacent said face than at the opposite end, and intermediate the ends, said base being provided with one fastener-receiving aperture adjacent each end whereby said door stop can be mounted with fasteners substantially spaced apart in the direction of movement of a door a sufficient distance that in ordinary mounting on material upon which door stops are normally mounted such material will have sufficient strength to securely retain the door stop in position even with excessive impact forces.

7. A door stop comprising an elongated base, an upstanding substantially one-quarter hollow sphere positioned transversely of said base intermediate the ends and opening toward the adjacent end, a rubber like bumper mounted within said sphere portion and projecting outwardly toward said adjacent end of said base, said adjacent end being of significantly greater width than the opposite end, said base being provided with one fastener receiving aperture adjacent each end whereby said door stop can be mounted with fasteners substantially spaced apart in the direction of movement of a door a sufficient distance that in ordinary mounting on material upon which door stops are normally mounted, such material will have sufficient strength to securely retain the door stop in position even with excessive impact forces.

8. The invention according to claim 7 in which a mounting base plate is provided with fastener receiving apertures spaced the same distance apart as the apertures in said door stop for raising the door stop to provide for stopping doors having floor clearance greater than the thickness of the base.

9. A door stop comprising an elongated base, an upstanding substantially one-quarter hollow sphere positioned transversely of said base intermediate the ends, and opening toward the adjacent end, a rubber like bumper mounted within said sphere portion and projecting outwardly toward said one end of said base, said base being provided with one fastener receiving aperture adjacent each end whereby said door stop can be mounted with fasteners substantially spaced apart in the direction of movement of a door a sufficient distance that in ordinary mounting on material upon which door stops are normally mounted, such material will have sufficient strength to securely retain the door stop in position even with excessive impact forces said hollow one-quarter sphere on the base being provided with a detent-engaging upstanding cam portion including a ridge positioned above the rubber like bumper for engagement by the outwardly projecting end of a bolt.

10. The invention according to claim 9 in which means are provided for raising and lowering the position of the upstanding cam ridge to accommodate the structure to various types of door holders.

11. The invention according to claim 8 in which the base of the door stop and the mounting base plate are provided with aligned keying apertures opening onto their abutting surfaces and closed at their other ends receiving dowel pins for maintaining the door stop and mounting base plate in relatively fixed relations.

12. A door stop comprising a base having a bore therethrough, a turret having a pivot shank extending through said bore, leaf spring means mounted on said shank and engaging said base to prevent separation of said turret from said base, said leaf spring and base having cooperating means to selectively retain said turret in at least two different angular positions, said turret having a ridge for cooperation with a door holder to retain a door holder equipped door in a fixed position.

13. A door stop comprising a base having an attaching flange extending around a major portion of the periphery thereof and an upstanding hub, said hub having a bore therethrough, a cap having a pivot stud rotatably mounted in the bore of said hub and secured in position against axial movement, means to securely retain said cap in two positions, a recess in said cap spaced a different distance from one side of the cap than the distance from the opposite side of the cap for cooperation with a door holder, whereby said recess may be retained in position with respect to the approach side of a door and the door side of the door stop for holding a door open or in a position in which a door holder slide cannot be retained in the recess.

14. A striker cap for mounting on a base comprising a pivot for mounting on the base, said cap having a recess on its exposed surface inwardly from the periphery thereof and spaced inwardly from one side of the cap a different distance than the spacing from another side of the cap, and means on said cap cooperable with means on the base to retain said cap in a position whereby the recess may be retained in position with respect to the approach side of a door and the door side of the base for cooperation with a door holder to retain a door in open position or in a position wherein said recess is out of the path of the door holder.

15. A door stop comprising an elongated member for projection from a supporting surface, a sleeve mounted on said elongated member, a cap having a pivot rotatably mounted on said sleeve, and prevented from axial movement relative to said sleeve and securable in two positions, a recess in said cap spaced a different distance from one side than from another side of the cap whereby said cap may be rotated so the recess is adjacent one side of said elongated member or distant therefrom for cooperation with or out of cooperative relation with a detent.

16. A door stop comprising a base having a peripheral flange around a major portion thereof and a recess in the bottom thereof, an upstanding boss on said flange having a bore therethrough thereby forming an annular ridge, a spring pressed ball mounted in said ridge and projecting above the upper end thereof, a cap having an annular groove of a size to snugly receive the annular ridge of said boss and having a pivot extending through the bore of said boss with a peripheral groove and means in said groove to prevent separation of said cap from said base, said cap having a pair of diametrically opposed recesses in communication with said annular groove for receiving said spring pressed ball to maintain said cap in adjusted position, said cap having a valley formed in its upper surface and having gradually sloping surfaces from the ridges defining the sides of the said valley to the periphery of said cap, said valley being eccentrically located relative to said pivot for selective cooperation with a door holder to maintain a door in open position or to assist in closing a door.

17. A door stop for attachment to a pipe comprising a sleeve having a bore at one end for snugly receiving a pipe, said sleeve having a second bore in communication therewith, said sleeve having a third bore in communication with said second bore, the other end of said sleeve providing an annular ridge, a cap having an annular groove of a size to snugly receive said annular ridge and a pivot stud of sufficient length to pass through said third bore and reach into said second bore, said pivot stud having a groove in its end, a locking ring in said groove to maintain said parts in assembled relation, said sleeve and said cap having registering flat peripheral surfaces and said cap having a valley formed therein eccentric to said pivot and closely adjacent said flat surface, a spring pressed detent in one of said cap and said sleeve and the other of said cap and said sleeve having a recess for cooperating with said detent for selectively retaining said cap with the flat surface in registry with the flat surface of the said sleeve or out of registry therewith.

18. A door stop comprising a base having an upstanding boss having a bore therethrough thereby forming an annular ridge, a spring pressed ball mounted in said ridge and projecting above the upper end thereof, a cap having an annular groove of a size to snugly receive the annular ridge of said boss and having a pivot extending the bore of said boss, means to prevent separation of said cap from said base, said cap having a pair of recesses in communication with said annular groove for receiving said spring pressed ball to maintain said cap in adjusted position, said cap having a ridge formed in its upper surface and having gradually sloping surfaces from the ridge defining the sides of the periphery of said cap, said ridge being eccentrically located relative to said pivot for selective cooperation with a door holder.

19. A holder comprising a chassis with a guideway formed therein, a slide slidably mounted in said guideway with one end projectable out of said guideway for cooperation with a keeper, a bolt slidably mounted on said slide and engageable with a shoulder on the slide to limit the projection of said slide, a spring reacting between a shoulder on said slide and a nut on said bolt, said nut being prevented from rotation relative to said chassis, a captive nut on said bolt prevented from axial movement relative to said chassis, whereby the position of said slide and the tension of said spring may be varied to obtain different amounts of projection of said slide and different degrees of projecting force on said slide.

20. A holder comprising a chassis with a guideway formed therein, a slide slidably mounted in said guideway with one end projectable out of said guideway for co-operation with a keeper, a bolt slidably mounted on said slide and engageable with a shoulder on the slide to limit the projection of said slide, a spring reacting between a shoulder on said slide and a nut on said bolt, means to prevent said nut from rotation, a captive nut on said bolt, means to prevent axial movement of said captive nut relative to said chassis whereby the position of said slide and the tension of said spring may be varied to obtain different amounts of projection of said slide and different degrees of projecting force on said slide.

21. A holder comprising a chassis, a detent mounted on said chassis for movement toward and away from said chassis and projectable out of said chassis, a bolt movably mounted with respect to said detent and engageable with a shoulder on said detent to limit the projection of said detent, a spring reacting between a shoulder on said detent and a nut on said bolt, means to prevent said nut from rotation, a captive nut on said bolt, means to prevent axial movement of said captive nut relative to said chassis whereby the position of said detent and the tension of said spring may be varied to obtain different amounts of projection of said slide and different degrees of projection of said detent.

22. A holder comprising a chassis, a detent mounted on said chassis for movement toward and away from said chassis, a bolt movably mounted with respect to one of said detent and chassis and engageable with a shoulder on the said one of said detent and chassis to limit the projection of said detent, a spring reacting between a shoulder on said one of said chassis and detent, a spring adjusting nut on said bolt, means to prevent said spring adjusting nut from rotation, a captive nut on said bolt, means to prevent axial movement of said captive nut relative to the other of said chassis and detent whereby the position of said detent and the tension of said spring may be varied to obtain different degrees of projection of said detent and different degrees of projecting force on said detent.

References Cited

UNITED STATES PATENTS

| | | | |
|---|---|---|---|
| 1,980,295 | 11/1934 | Schnell | 292—340 |
| 2,759,753 | 8/1956 | Payor | 292—341.18 |
| 2,479,597 | 8/1947 | Anton | 16—86 |
| 2,808,609 | 10/1957 | Schultz | 16—86 |
| 783,033 | 2/1905 | Fraser | 292—75 |
| 1,038,111 | 9/1912 | Foss | 292—75 |
| 510,163 | 12/1893 | David | 292—74 |
| 633,979 | 9/1899 | Bleha | 292—74 |
| 2,311,278 | 2/1943 | Johnson | 16—86 |
| 2,715,242 | 8/1955 | Smith | 16—86 |
| 2,809,061 | 10/1957 | Beyer | 292—75 |

RICHARD E. MOORE, *Primary Examiner.*

UNITED STATES PATENT OFFICE
CERTIFICATE OF CORRECTION

Patent No. 3,415,561                                                                December 10, 1968

H Know Bryson et al.

It is certified that error appears in the above identified patent and that said Letters Patent are hereby corrected as shown below:

Column 22, line 62, beginning with "with a face" cancel all to and including "base" in line 65, same column 22 and insert -- with a face thereof transverse of said base intermediate the ends, said base being of significantly greater width at the end adjacent said face than at the opposite end, said --.

Signed and sealed this 10th day of March 1970.

(SEAL)
Attest:

Edward M. Fletcher, Jr.                            WILLIAM E. SCHUYLER, JR.
Attesting Officer                                                 Commissioner of Patents